United States Patent
Suwa et al.

(10) Patent No.: US 7,616,404 B2
(45) Date of Patent: Nov. 10, 2009

(54) MAGNETIC RECORDING MEDIUM, MAGNETIC RECORDING AND REPRODUCING APPARATUS, AND METHOD FOR MANUFACTURING MAGNETIC RECORDING MEDIUM

(75) Inventors: Takahiro Suwa, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 95 days.

(21) Appl. No.: 12/004,074

(22) Filed: Dec. 20, 2007

(65) Prior Publication Data

US 2008/0170318 A1  Jul. 17, 2008

(30) Foreign Application Priority Data

Dec. 25, 2006  (JP) .............................. 2006-348243

(51) Int. Cl.
*G11B 5/82* (2006.01)
(52) U.S. Cl. ..................................................... 360/135
(58) Field of Classification Search ................... 360/135
See application file for complete search history.

(56) References Cited

U.S. PATENT DOCUMENTS

| | | | |
|---|---|---|---|
| 6,014,296 A | 1/2000 | Ichihara et al. | |
| 2005/0045581 A1* | 3/2005 | Suwa et al. | .................... 216/22 |
| 2005/0191526 A1 | 9/2005 | Fujita et al. | |
| 2005/0213239 A1 | 9/2005 | Hibi et al. | |
| 2005/0214583 A1 | 9/2005 | Ito et al. | |
| 2007/0008833 A1* | 1/2007 | Yamakage et al. | ....... 369/13.38 |
| 2007/0072013 A1* | 3/2007 | Haginoya et al. | ........ 428/847.1 |
| 2007/0190365 A1* | 8/2007 | Kodama et al. | ............. 428/832 |

FOREIGN PATENT DOCUMENTS

| | | |
|---|---|---|
| JP | A-06-195907 | 7/1994 |
| JP | A-09-097419 | 4/1997 |
| JP | A 11-110748 | 4/1999 |
| JP | A 2000-293840 | 10/2000 |
| JP | A-2005-243130 | 9/2005 |
| JP | A-2005-243131 | 9/2005 |
| JP | A-2005-276275 | 10/2005 |
| JP | A 2006-348243 | 12/2006 |
| WO | WO 2005/064598 A1 | 7/2005 |

* cited by examiner

*Primary Examiner*—Allen T Cao
(74) *Attorney, Agent, or Firm*—Oliff & Berridge, PLC

(57) ABSTRACT

The magnetic recording medium includes a substrate and a recording layer formed in a predetermined concavo-convex pattern over the substrate, and the recording layer includes recording elements each formed as a convex portion of the recording layer. Surface steps are formed in an inner area including a radially innermost portion of a recording area. Each surface step is formed in such a manner that a portion over a concave portion between the recording elements is recessed toward a substrate to a level below a portion over the recording element. The surface steps are formed such that the recording area can be sectioned into an annular area adjoining the inner area and the inner area where height of the surface steps is larger than that in the annular area.

13 Claims, 13 Drawing Sheets

MAGNETIC RECORDING MEDIUM, MAGNETIC RECORDING AND REPRODUCING APPARATUS, AND METHOD FOR MANUFACTURING MAGNETIC RECORDING MEDIUM

BACKGROUND OF THE INVENTION

1. Field of the Invention

The present invention relates to a magnetic recording medium in which a recording layer is formed in a predetermined concavo-convex pattern and recording elements are each formed as a convex portion of the concavo-convex pattern. The present invention also relates to a magnetic recording and reproducing apparatus provided with such a magnetic recording medium and a method for manufacturing the magnetic recording medium.

2. Description of the Related Art

Conventional magnetic recording media, such as hard disks, are sectioned into data areas and servo areas for use, and servo information for, for example, magnetic head alignment is recorded in the servo areas.

The servo area is further sectioned into a preamble area for clock synchronization, a servo address mark (SAM) area for indicating the start of servo data, a track address signal area for indicating a track number, a sector address signal area for indicating a sector number, a burst signal area for tracking a magnetic head, and the like. Servo information appropriate for the purpose is recorded in each of the above areas.

Specifically, the servo information is recorded as a predetermined servo pattern such that binary information, being a "0" or "1," is recorded in each magnetic domain corresponding to one bit of information. In conventional longitudinal recording media, binary information of "0" or "1" is recorded by magnetizing each magnetic domain in one or the opposite circumferential direction. Alternatively, in perpendicular recording media which have become increasingly common in recent years, binary information of "0" or "1" is recorded by magnetizing each magnetic domain in one direction perpendicular to its surface or in the opposite direction.

In the step of recording such servo information, magnetic domains are sequentially magnetized based on binary information of "0" or "1" for each magnetic recording medium. Hence, low productivity tends to be a problem. In particular, in recent years, with an increase in areal density and with a decrease in the head flying height accompanying the increase in areal density, high density and high precision recording is required even for the servo information. Therefore, there are growing demands to improve the efficiency of servo information recording.

In view of the foregoing, a technique has been proposed in which, in a servo area, a recording layer is formed only in either areas for recording information of "0" or the other areas for recording information of "1" and this recording layer is formed in the shape of a servo pattern (see, for example, Japanese Patent Application Laid-Open No. Hei 6-195907). In this manner, by uniformly applying a direct current magnetic field to such a magnetic recording medium, the recording layer is magnetized so as to conform to the servo pattern. Therefore, the servo information recording efficiency can be significantly improved.

Meanwhile, a significant improvement in the areal density of magnetic recording media has been achieved by, for example, reducing the size of magnetic particles constituting a recording layer, changing materials, and improving the precision of head processing. A further improvement in the areal density is expected in the future. However, problems such as incorrect recording of information on a track adjacent to a target recording track and crosstalk during reproduction caused by the limit of magnetic head processing and by the broadening of the recording magnetic field emanating from a magnetic head have become apparent. Therefore, the improvement of the areal density by conventional improvement techniques has reached its limit.

Hence, discrete track media and patterned media have been proposed as candidates for magnetic recording media in which a further improvement in the areal density can be achieved. In the discrete track media and patterned media, a recording layer is formed in a concavo-convex pattern in a data area, and recording elements are each formed as a convex portion of the concavo-convex pattern. When such discrete track media and patterned media are manufactured, the recording elements are formed as the convex portions in the data area. Therefore, recording elements can be formed in a servo pattern in the servo area, and this is particularly advantageous in terms of productivity.

In order to obtain excellent recording-reproducing characteristics, it is considered that, preferably, the flying height of a magnetic head is kept constant so that the magnetic gap between the magnetic head and the upper surface of each recording element is held constant. Hence, it has been proposed to flatten the surface of a magnetic recording medium by filling concave portions between recording elements with a filling material such as a non-magnetic material.

As described above, the areal density of magnetic recording media has increased significantly, so that the size of magnetic domains has decreased. Therefore, in order to obtain excellent recording-reproducing characteristics, it is important to obtain a servo signal with a high signal-to-noise (S/N) ratio. In order to obtain a servo signal with a high S/N ratio, it is preferable that the direction of magnetization be clearly reversed across the boundary between a magnetic domain storing information of "0" and a magnetic domain storing information of "1."

However, in practice, a magnetic transition region in which recorded information is recognized as neither "0" nor "1" is present around the boundary between magnetic domains. Such a magnetic transition region can be a source of noise. The circumferential length of the magnetic transition region is nearly constant irrespective of the circumferential length of the adjacent magnetic domains.

Meanwhile, as described above, since the areal density of magnetic recording media has increased significantly, so that the circumferential length of magnetic domains has decreased, the ratio of the circumferential length of the magnetic transition region relative to the circumferential length of the magnetic domains is increasing. Hence, the S/N ratio of a servo signal tends to decrease.

Moreover, in a disk-shaped magnetic recording medium such as a hard disk, its circumferential speed relative to a magnetic head is higher on the outer side in the radial direction and is lower on the inner side in the radial direction. However, the frequency corresponding to the number of information recording-reproduction processes per unit time is constant irrespective of the position on the magnetic recording medium. Therefore, the circumferential length of magnetic domains each corresponding to one bit of information is larger on the outer side of the magnetic recording medium and is smaller on the inner side. Hence, there is a problem that the S/N ratio of a servo signal is likely to decrease particularly in an inner area of a magnetic recording medium.

SUMMARY OF THE INVENTION

In view of the foregoing problems, various exemplary embodiments of this invention provide a high areal density and high reliability magnetic recording medium in which recording elements are each formed as a convex portion of a concavo-convex pattern and in which a servo signal with a sufficiently high S/N ratio can be obtained from an inner area of the magnetic recording medium. Furthermore, various exemplary embodiments of this invention also provide a magnetic recording and reproducing apparatus provided with such a magnetic recording medium and a method for manufacturing the magnetic recording medium.

The above object is achieved by a magnetic recording medium comprising a substrate and a recording layer formed in a predetermined concavo-convex pattern over the substrate, the recording layer including recording elements each formed as a convex portion of the recording layer, wherein surface steps are formed in an inner area including a radially innermost portion of a recording area, each surface step being formed in such a manner that a portion over a concave portion between the recording elements is recessed toward the substrate to a level below a portion over the recording element, and wherein the surface steps are formed such that the recording area can be sectioned into an annular area adjoining the inner area and the inner area where height of the surface steps therein is larger than that in the annular area.

Moreover, the above object is achieved by a magnetic recording medium comprising a substrate and a recording layer formed in a predetermined concavo-convex pattern over the substrate, the recording layer including recording elements each formed as a convex portion of the recording layer, wherein surface steps are formed in an inner area including a radially innermost portion of a recording area and in an outer area including a radially outermost portion of the recording area, each surface step being formed in such a manner that a portion over a concave portion between the recording elements is recessed toward the substrate to a level below a portion over the recording element, and wherein the surface steps are formed such that the recording area can be sectioned into: an annular intermediate area disposed between the inner area and the outer area so as to be adjoin the inner area; the inner area where height of the surface steps therein is larger than that in the annular intermediate area; and the outer area where height of the surface steps therein is larger than that in the annular intermediate area.

Furthermore, the above object is achieved by a magnetic recording medium comprising a substrate and a recording layer formed in a predetermined concavo-convex pattern over the substrate, the recording layer including recording elements each formed as a convex portion of the recording layer, wherein surface steps are formed in a recording area, each surface step being formed in such a manner that a portion over a concave portion between the recording elements is recessed toward the substrate to a level below a portion over the recording element, and wherein the surface steps are formed such that an area including at least a radially innermost portion of the recording area is provided where height of the surface steps increases in a radially inward direction.

By setting the height of the surface steps in the inner area to be larger than that in the annular area adjoining the inner area, the flying height of a magnetic head is made smaller in the inner area than in the annular area adjoining the inner area. Therefore, the magnetic gap between the magnetic head and the upper surface of each recording element is made smaller in the inner area than in the annular area adjoining the inner area. Hence, the output level of a servo signal is made larger in the inner area than in the annular area adjoining the inner area.

Meanwhile, the term "noise" includes that caused by, for example, an electrical circuit and the sliding motion of the arm of a magnetic head. The magnitude of such noise does not largely increase or decrease even when the magnetic gap between the upper surface of each recording element and the magnetic head increases or decreases. Even if the magnitude of the noise increases or decreases, the amount of the increase or decrease is small relative to the amount of increase or decrease of the output level of the servo signal.

Hence, in the inner area, the magnitude of the noise produced is small relative to the output level of the servo signal, and therefore the S/N ratio is improved.

As described above, in various exemplary embodiments of the present invention, the height of the surface steps in the inner area is made larger than that in the annular area adjoining the inner area. In this manner, the flying height of the magnetic head in the inner area is lowered relative to that in the annular area adjoining the inner area, whereby the S/N ratio in the inner area is improved. Therefore, the present invention has been developed based on a concept that is totally different from that of the conventional technology in which an attempt is always made to keep the flying height of the magnetic head constant by flattening the surface of the magnetic recording media.

Accordingly, various exemplary embodiments of this invention provide a magnetic recording medium comprising: a substrate; and a recording layer formed in a predetermined concavo-convex pattern over the substrate, the recording layer including recording elements each formed as a convex portion of the recording layer, wherein surface steps are formed in an inner area including a radially innermost portion of a recording area, each surface step being formed in such a manner that a portion over a concave portion between the recording elements is recessed toward the substrate to a level below a portion over the recording element, and wherein the surface steps are formed such that the recording area can be sectioned into an annular area adjoining the inner area and the inner area where height of the surface steps therein is larger than that in the annular area.

Moreover, various exemplary embodiments of this invention provide a magnetic recording medium comprising: a substrate; and a recording layer formed in a predetermined concavo-convex pattern over the substrate, the recording layer including recording elements each formed as a convex portion of the recording layer, wherein surface steps are formed in an inner area including a radially innermost portion of a recording area and in an outer area including a radially outermost portion of the recording area, each surface step being formed in such a manner that a portion over a concave portion between the recording elements is recessed toward the substrate to a level below a portion over the recording element, and wherein the surface steps are formed such that the recording area can be sectioned into: an annular intermediate area disposed between the inner area and the outer area so as to adjoin the inner area; the inner area where height of the surface steps therein is larger than that in the annular intermediate area; and the outer area where height of the surface steps therein is larger than that in the annular intermediate area.

Furthermore, various exemplary embodiments of this invention provide a magnetic recording medium comprising: a substrate; and a recording layer formed in a predetermined concavo-convex pattern over the substrate, the recording layer including recording elements each formed as a convex portion of the recording layer, wherein surface steps are formed in a recording area, each surface step being formed in such a manner that a portion over a concave portion between the recording elements is recessed toward the substrate to a level below a portion over the recording element, and wherein the surface steps are formed such that an area including at least a radially innermost portion of the recording area is provided where height of the surface steps increases in a radially inward direction.

Various exemplary embodiments of this invention provide a method for manufacturing a magnetic recording medium, comprising at least one of the following steps: a recording layer processing step of forming recording elements as convex portions by irradiating a disk-shaped workpiece with a processing gas by means of one of ion beam etching in which a divergence state of an ion beam can be controlled and reactive ion etching in which a bias voltage to be applied to the workpiece can be controlled, the workpiece including a continuous recording layer and a mask layer formed in a concavo-convex pattern corresponding to a predetermined concavo-convex pattern over the recording layer, the workpiece being irradiated with the processing gas such that an etching rate is larger in an inner area including a radially innermost portion of a recording area than in an annular area adjoining the inner area, whereby the recording layer is processed into the predetermined concavo-convex pattern; a filling material deposition step of depositing a filling material over a workpiece by means of bias sputtering in which a bias voltage to be applied to the workpiece can be controlled, the workpiece including recording elements formed as convex portions of a recording layer formed in a predetermined concavo-convex pattern over a substrate, the filling material being deposited such that a deposition rate is lower in an inner area including a radially innermost portion of a recording area than in an annular area adjoining the inner area; and a flattening step of removing an excess portion of a filling material above recording elements by irradiating a workpiece with a processing gas by means of one of ion beam etching in which a divergence state of an ion beam can be controlled and reactive ion etching in which a bias voltage to be applied to the workpiece can be controlled, the workpiece including the recording elements which are formed as convex portions of a recording layer formed in a predetermined concavo-convex pattern over a substrate and the filling material which is deposited over the recording elements and which fills into each concave portion between the recording elements, the workpiece being irradiated with the processing gas such that an etching rate is larger in an inner area including a radially innermost portion of a recording area than in an annular area adjoining the inner area, wherein surface steps are formed in the inner area, each surface step being formed in such a manner that a portion over a concave portion between the recording elements is recessed toward the substrate to a level below a portion over the recording element, and the surface steps are formed such that the recording area can be sectioned into the annular area adjoining the inner area and the inner area where height of the surface steps therein is larger than that in the annular area.

In the present application, the expression "a recording layer formed in a predetermined concavo-convex pattern over a substrate" is used to include, in addition to a recording layer formed by dividing a continuous recording layer into a large number of recording elements forming a predetermined pattern, for example: a recording layer including track-shaped recording elements which are continuous at their end portions; a recording layer including recording elements partially formed over a substrate, e.g., a recording layer including spiral-shaped recording elements; a recording layer in which concave portions are formed to a halfway depth thereof in the thickness direction so that the surface on the substrate side is continuous; a continuous recording layer formed so as to follow the surface of a layer therebelow or a substrate formed in a concavo-convex pattern; and a recording layer formed separately on the upper surfaces of the convex portions of a layer therebelow or of a substrate formed in a concavo-convex pattern and on the bottom surfaces of the concave portions of the layer therebelow or of the substrate.

Furthermore, in the present application, the expression "recording area" is used to refer to an area composed of an area in which a track pattern for data recording is formed and an area in which a servo pattern corresponding to the track pattern is formed.

Moreover, in the present application, the expression "a portion over the recording element" is used to refer to the upper surface of the uppermost layer over the corresponding recording element when the upper surface (being the surface opposite to a substrate) of the corresponding recording element is covered entirely with a different layer. When a part of the upper surface of the corresponding recording element is exposed and the other portion is covered with a different layer, the expression is used to refer to an exposed portion of the upper surface of the corresponding recording element and the upper surface of the uppermost layer. Also, when the entire upper surface of the corresponding recording element is exposed, the expression is used to refer to the upper surface of the corresponding recording element.

Furthermore, in the present application, the expression "a portion over a concave portion" is used to refer to the upper surface of the uppermost layer over a filling material when the concave portion is filled with the filling material and the upper surface (being the surface opposite to a substrate) of the filling material is covered entirely with a different layer. When a part of the upper surface of the filling material is exposed and the other portion is covered with a different layer, the expression is used to refer to an exposed portion of the upper surface of the filling material and the upper surface of the uppermost layer. When the entire upper surface of the filling material is exposed, the expression is used to refer to the upper surface of the filling material. When the concave portion is not filled with the filling material and the entire bottom surface of the concave portion is covered with a different layer, the expression is used to refer to the upper surface of the uppermost layer on the bottom surface of the concave portion. When a part of the bottom surface of the concave portion is exposed and the other portion is covered with a different layer, the expression is used to refer to an exposed portion of the bottom surface of the concave portion and the upper surface of the uppermost layer. In addition, when the entire bottom surface of the concave portion is exposed, the expression is used to refer to the bottom surface of the concave portion.

Moreover, in the present application, the expression "height of the surface steps" is used to refer to the distance in the thickness direction between the lowest portion (being the closest portion to a substrate) of a portion over a corresponding concave portion and the highest portion (being the farthest portion from the substrate) of a portion over the corresponding recording element adjacent to the corresponding concave portion.

Furthermore, in the present application, the expression "magnetic recording media" is not limited to media, such as hard disks and floppy (registered trademark) disks, in which magnetism alone is used for recording and reading information. This expression is also used to refer to magneto-optical recording media, such as MO disks, in which both magnetism and light are used and to heat assisted type recording media in which both magnetism and heat are used.

Further to this, in the present application, the expression "each step between the upper surface of the filling material and the upper surface of the recording element is reflected in a corresponding surface step" is not limited to the case in which the height of the step between the upper surface of the filling material and the upper surface of the recording element is the same as the height of the corresponding surface step thereover. The expression is also used to include the case in which the large/small relationship in step height between the steps located between the upper surface of the filling material and the upper surface of the recording elements agrees with the large/small relationship in step height between the surface steps, e.g., the case in which each surface step has a height which is equivalent to a value obtained by increasing or decreasing by a constant factor, the height of the corresponding step between the upper surface of the filling material and the upper surface of the recording element therebelow.

Moreover, in the present application, the term "etching rate" is used to refer to the amount etched in the thickness direction of a substrate per unit time.

Furthermore, in the present application, the term "deposition rate" is used to refer to the amount deposited in the thickness direction of a substrate per unit time.

DETAILED DESCRIPTION OF THE PREFERRED EMBODIMENTS

Hereinafter, preferred exemplary embodiments of the present invention will be described in detail with reference to the accompanying drawings.

Figure 1:
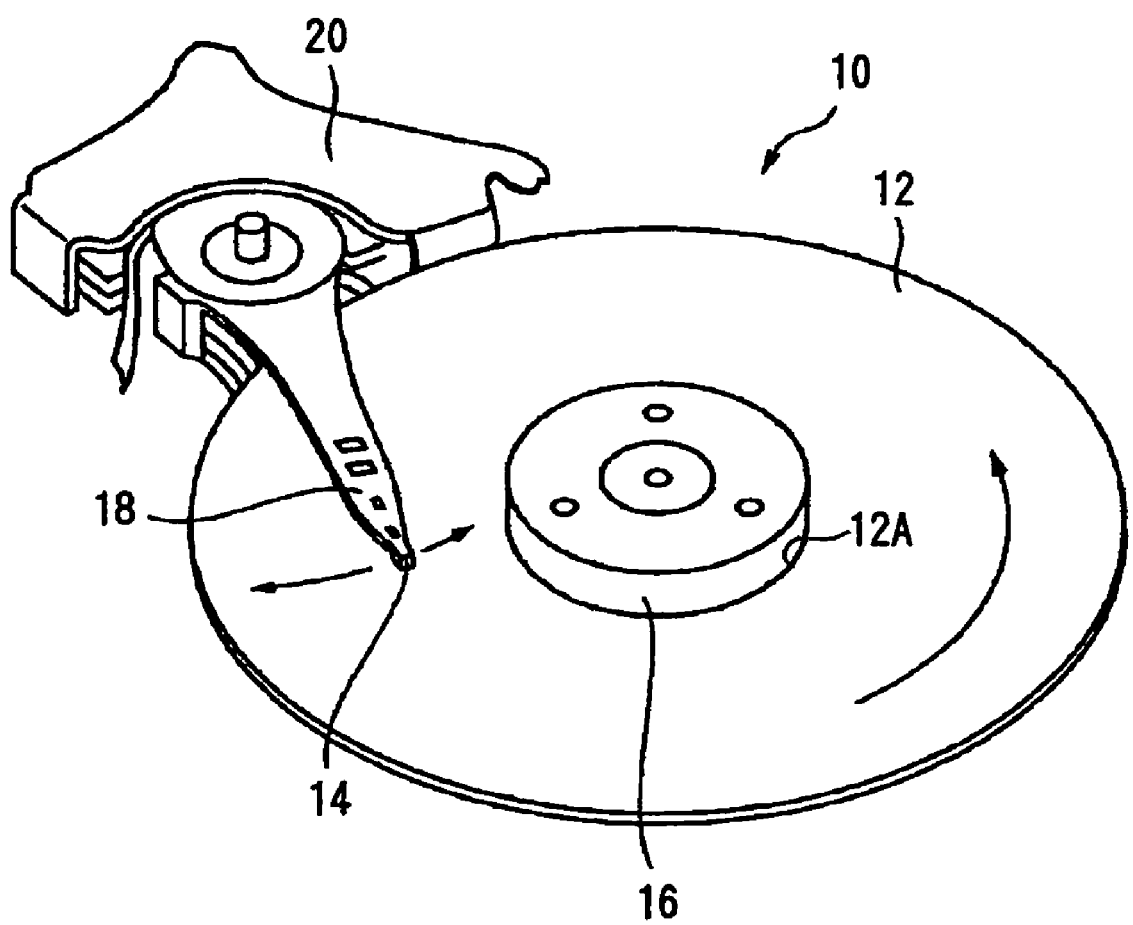
FIG. 1 is a perspective view schematically illustrating the general structure of the main part of a magnetic recording and reproducing apparatus according to a first exemplary embodiment of the present invention.

As shown in FIG. 1, a magnetic recording and reproducing apparatus 10 according to a first exemplary embodiment of the present invention includes: a magnetic recording medium 12; and a flying type magnetic head 14 disposed so as to be capable of flying above the surface of the magnetic recording medium 12 in order to record/reproduce data on/from the magnetic recording medium 12. The magnetic recording and reproducing apparatus 10 is characterized by the structure of the magnetic recording medium 12. The description of the configuration of other components is omitted as appropriate because they does not seem to be essential for gaining an understanding of the first exemplary embodiment.

The magnetic recording medium 12 has a center hole 12A and is secured to a chuck 16 through the center hole 12A. The magnetic recording medium 12 is configured so as to be rotatable together with the chuck 16. The magnetic head 14 is attached near the end of an arm 18, and the arm 18 is rotatably attached to a base 20. Hence, the magnetic head 14 can move through an arc-shaped trajectory in the radial direction of the magnetic recording medium 12 while flying and is located in close proximity to the surface of the magnetic recording medium 12.

Figure 2:
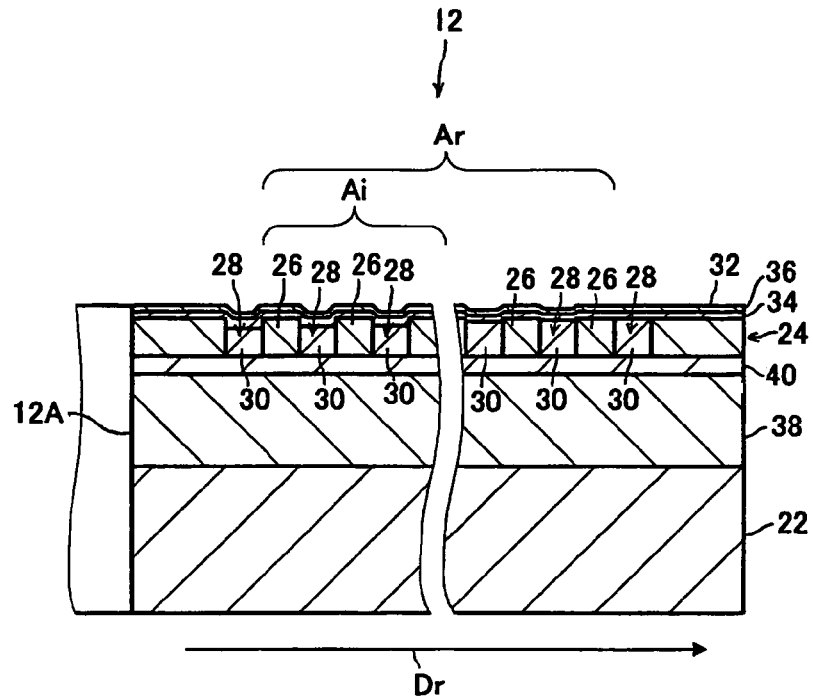
FIG. 2 is a cross-sectional view in the radial direction, schematically illustrating the structure of a magnetic recording medium of the magnetic recording and reproducing apparatus.

The magnetic recording medium 12 is a disk-shaped discrete track medium of a perpendicular recording type. As shown in FIG. 2, the magnetic recording medium 12 includes: recording elements 26 formed as convex portions of a recording layer 24 formed in a predetermined concavo-convex pattern over a substrate 22; and a non-magnetic filling material 30 filled into concave portions 28 between the recording elements 26. As shown in the enlarged view shown in FIG. 3, an upper surface 30A of the filling material 30 is recessed toward the substrate 22 to a level below an upper surface 26A of the recording element 26. In an inner area Ai including the innermost portion (in a radial direction Dr) of a recording area Ar, each step on a surface 32 is formed such that a step between the upper surface 30A of the filling material 30 and the upper surface 26A of the adjacent recording element 26 is reflected in a corresponding step on the surface 32. The steps on the surface 32 are formed such that the recording area Ar can be sectioned into an annular area adjoining the inner area Ai and the inner area Ai where the height of the steps on the surface 32 is greater than that in the annular area.

The expression "the height of the steps on the surface 32 is greater than that in the annular area" is not limited to the case in which the height of the steps on the surface 32 is greater in all the positions in the inner area Ai than in all the positions in the annular area adjoining the inner area Ai.

For example, the expression is used to include the case in which, although the above relationship is not satisfied at a small number of positions, the height of steps in most (for example, 90% or more) of the positions in the inner area Ai is greater than the height of steps in most (for example, 90% or more) of the positions in the annular area adjoining the inner area Ai. Whether or not the height of steps in most (for example, 90% or more) of the positions in the inner area Ai is greater than the height of steps in most (for example, 90% or more) of the positions in the annular area adjoining the inner area Ai can be determined by, for example, examining whether or not the height of steps at 90% or more of several tens to several hundreds of arbitrary selected measurement points in the inner area Ai is greater than the height of steps at 90% or more of several tens to several hundreds of arbitrary selected measurement points in the annular area adjoining the inner area Ai.

Moreover, the expression is used to include the case in which the arithmetic mean value of the height of the steps on the surface 32 in the inner area Ai is greater than the arithmetic mean value of the height of the steps on the surface 32 in the annular area adjoining the inner area Ai. Whether or not the arithmetic mean value of the height of the steps on the surface 32 in the inner area Ai is greater than the arithmetic mean value of the height of the steps on the surface 32 in the annular area adjoining the inner area Ai can be determined by, for example, examining whether or not the arithmetic mean value of the height of steps of several tens to several hundreds of arbitrary selected measurement points in the inner area Ai is greater than the arithmetic mean value of the height of steps of several tens to several hundreds of arbitrary selected measurement points in the annular area adjoining the inner area Ai.

In the first exemplary embodiment, in the inner area Ai, each step between the upper surface 30A of the filling material 30 and the upper surface 26A of an adjacent recording element 26 is reflected in the corresponding step on the surface 32 thereover. Such a step on the surface 32 is also formed in the annular area adjoining the inner area Ai. In addition, the height of the steps on the surface 32 continuously increases inward in the radial direction Dr.

The expression "the height of the steps on the surface 32 continuously increases inward in the radial direction Dr" is not limited to the case in which the height of the steps on the surface 32 in the recording area Ar continuously increases inward in the radial direction Dr in all the positions.

For example, the expression is used to include the case in which, although the above relationship is not satisfied in a small number of positions, the height of steps in most (for example, 90% or more) of the positions in the recording area Ar satisfy the above relationship. Whether or not the height of steps in most (for example, 90% or more) of the positions in the recording area Ar satisfy the above relationship can be determined by, for example, examining whether or not the height of steps in 90% or more of several tens to several hundreds of arbitrary selected measurement points in the recording area Ar continuously increase inward in the radial direction Dr.

Figure 3:
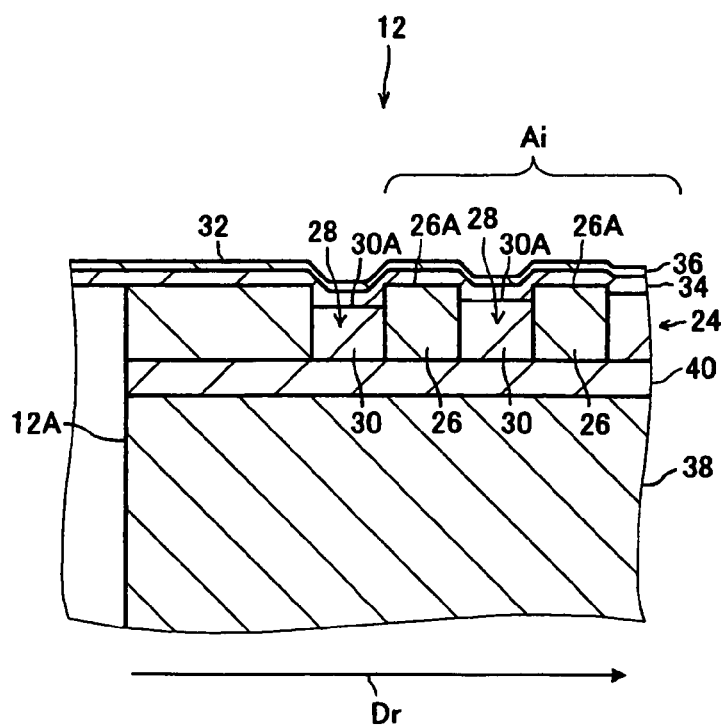
FIG. 3 is an enlarged cross-sectional view in the radial direction, schematically illustrating the structure near the surface of the magnetic recording and reproducing apparatus.

In FIGS. 2 and 3, for ease of understanding, the recording layer 24 is drawn thicker than the actual layer, in contrast to the other layers. In addition to this, the height of the steps on the surface 32 is more exaggerated than the actual height of steps. This is also the case in FIGS. 5 to 9 and FIGS. 11 to 16 described later.

The substrate 22 is mirror polished on the recording layer 24 side. A non-magnetic material such as glass, an Al alloy coated with NiP, Si, or $Al_2O_3$ may be used as the material for the substrate 22.

The recording layer 24 has a thickness of 5 to 30 nm. A CoCr-based alloy such as a CoCrPt alloy, an FePt-based alloy, a stacked body thereof, a material formed of an oxide material, such as $SiO_2$, and ferromagnetic particles, such as CoPt particles, contained in the oxide material in a matrix form, or the like may be used as the material for the recording layer 24.

In a data area in the recording area Ar, the recording elements 26 are each formed in a concentric track shape and are formed at small intervals in the radial direction Dr. FIGS. 2 and 3 illustrate the configuration described above. In a servo area in the recording area Ar, the recording elements 26 are formed in a predetermined servo pattern (not shown).

An oxide such as $SiO_2$, $Al_2O_3$, $TiO_2$, or ferrite, a nitride such as AlN, a carbide such as SiC, C (carbon), a non-magnetic metal such as Cu or Cr, a resin material, or the like may be used as the material for the filling material 30.

The upper surface 30A of the filling material 30 is recessed toward the substrate 22 to a level below the upper surface 26A of each of the adjacent recording elements 26. Furthermore, the height of the step between the upper surface 26A of the recording element 26 and the upper surface 30A of the filling material 30 increases inward in the radial direction Dr.

A protection layer 34 and a lubrication layer 36 are formed in this order over the recording elements 26 and the filling material 30. When the protection layer 34 is covered entirely with the lubrication layer 36, the upper surface of the lubrication layer 36 serves as the surface 32. When the protection layer 34 is partially covered with the lubrication layer 36, the upper surface of the lubrication layer 36 and the upper surface of the protection layer 34 exposed from the lubrication layer 36 serve as the surface 32. The protection layer 34 and the lubrication layer 36 are formed such that each step between the upper surface 26A of the recording element 26 and the upper surface 30A of the filling material 30 is reflected in a corresponding step on their upper surfaces. Hence, each step between the upper surface 26A of the recording element 26 and the upper surface 30A of the filling material 30 is reflected in the corresponding step on the surface 32, and the height of the steps on the surface 32 increases inward in the radial direction Dr.

The protection layer 34 has a thickness of 1 to 5 nm. For example, a hard carbon film, so-called diamond-like carbon, may be used as the material for the protection layer 34. In the present application, the term "diamond-like carbon (hereinafter referred to as "DLC")" is used to refer to a material formed mainly of carbon, having an amorphous structure, and having a hardness of approximately $2 \times 10^9$ to approximately $8 \times 10^{10}$ Pa as measured by Vickers hardness test. Moreover, the lubrication layer 36 has a thickness of 1 to 2 nm. PFPE (perfluoro polyether) or the like may be used as the material for the lubrication layer 36.

A soft magnetic layer 38 and a seed layer 40 are formed between the substrate 22 and the recording layer 24. The seed layer 40 can impart magnetic anisotropy in a thickness direction (a direction perpendicular to the surface) to the recording layer 24. The soft magnetic layer 38 has a thickness of 50 to 300 nm. An Fe alloy, a Co amorphous alloy, ferrite, or the like may be used as the material for the soft magnetic layer 38. The soft magnetic layer 38 may have a stacked structure of a soft magnetic layer and a non-magnetic layer. The seed layer 40 has a thickness of 2 to 40 nm. A nonmagnetic material such as a CoCr alloy, Ti, Ru, a stacked body of Ru and Ta, MgO, or the like may be used as the material for the seed layer 40.

A description will now be given of the action of the magnetic recording and reproducing apparatus 10 provided with the magnetic recording medium 12.

In the magnetic recording medium 12, since the height of the steps on the surface 32 is greater in the inner area Ai than in the annular area adjoining the inner area Ai, the flying height of the magnetic head 14 is lower in the inner area Ai than in the annular area adjoining the inner area Ai. Therefore, the magnetic gap between the upper surface 26A of each recording element 26 and the magnetic head 14 is smaller in the inner area Ai than in the annular area adjoining the inner area Ai. Hence, the output level of a servo signal is greater in the inner area Ai than in the annular area adjoining the inner area Ai.

Meanwhile, the term "noise" includes that caused by, for example, an electrical circuit and the sliding motion of the arm of the magnetic head. The magnitude of such noise does not largely increase or decrease with an increase or decrease of the magnetic gap between the upper surface 26A of each recording element 26 and the magnetic head 14. Even if the magnitude of the noise increases or decreases, the amount of the increase or decrease is small relative to the amount of increase or decrease of the output level of the servo signal.

Hence, in the inner area Ai, the magnitude of the noise is small relative to the output level of the servo signal, and therefore the S/N ratio is improved.

Since the steps are formed on the surface 32, the flying height of the magnetic head 14 is reduced by about one half of the height of the steps on the surface 32 when compared with the case in which the surface is flat. Since the assumed average flying height of the magnetic head 14 is in the range of 5 to 20 mm, the maximum value of the height of the steps on the surface 32 is preferably approximately 3 nm, in order to reliably avoid collision of the magnetic head 14 with the magnetic recording medium 12.

Preferably, the height of the steps on the surface 32 satisfies the above relationship at as many different positions as possible. However, even when the above relationship is not satisfied at a small number of positions, the flying height of the magnetic head 14 is smaller in the inner area Ai than in the annular area adjoining the inner area Ai when the height of steps in most (for example, 90% or more) of the positions in the inner area Ai are greater than the height of steps in most (for example, 90% or more) of the positions in the annular area adjoining the inner area Ai. Therefore, in the inner area Ai, the magnitude of the noise is small relative to the output level of the servo signal, and the effect of an improved S/N ratio is obtained.

Moreover, when the arithmetic mean value of the height of the steps on the surface 32 in the inner area Ai is larger than that in the annular area adjoining the inner area Ai, the flying height of the magnetic head 14 is smaller in the inner area Ai than in the annular area adjoining the inner area Ai. Therefore, in the inner area Ai, the magnitude of the noise is small relative to the output level of the servo signal, and the effect of an improved S/N ratio is obtained.

Preferably, the steps on the surface 32 are formed such that the recording area Ar can be sectioned into the inner area Ai and an annular area having a width in the radial direction Dr that is the same as that of the inner area Ai.

Preferably, when the recording area Ar is composed only of the inner area Ai and the annular area, the steps on the surface 32 are formed such that the recording area Ar can be sectioned into the inner area Ai and the annular area so as to be bisected at the midpoint in the radial direction Dr.

Figure 4:
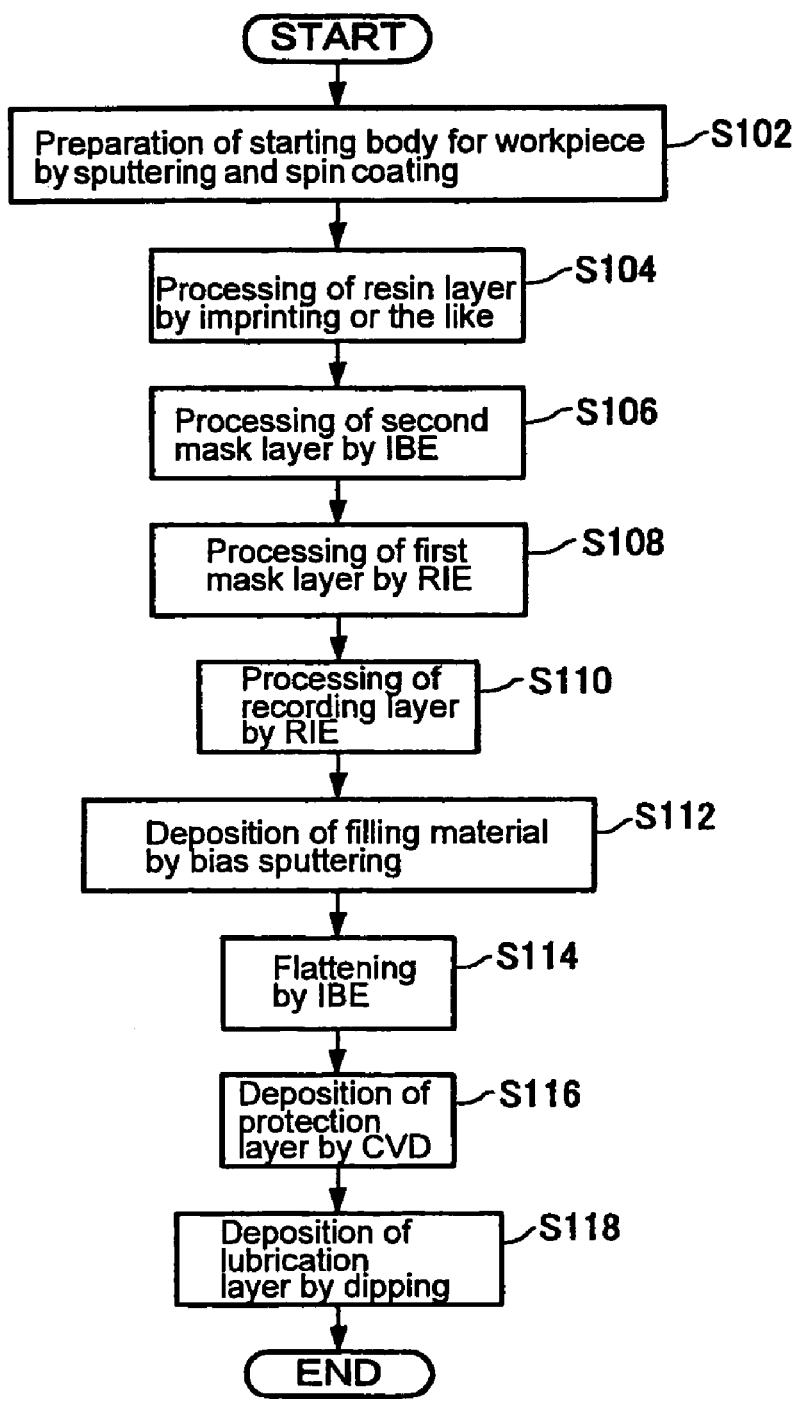
FIG. 4 is a flowchart showing the outline of the manufacturing steps of the magnetic recording medium.

A description will now be given of a method for manufacturing the magnetic recording medium 12 with reference to the flowchart shown in FIG. 4.

First, a soft magnetic layer 38, a seed layer 40, a continuous recording layer (an unprocessed recording layer 24), a first mask layer, and a second mask layer are formed over the substrate 22 in that order by means of a sputtering method, and then a resin layer is applied thereto by means of a spin coating method, whereby a starting body for a workpiece is prepared (S102). TaSi, for example, may be used as the material forming the first mask layer. Ni, for example, may be used as the material forming the second mask layer. Furthermore, a resist material or an acrylic resin, for example, may be used as the material forming the resin layer.

A concavo-convex pattern corresponding to a track pattern in the data area and to a servo pattern in the servo area is transferred to the resin layer by means of a nano imprint method using a transferring device (not shown) (S104). In this instance, the resin layer of the bottom surface of the concave portions is removed by means of RIE (reactive ion etching) using $O_2$ gas.

Subsequently, the second mask layer of the bottom surface of the concave portions is removed by means of IBE (ion beam etching) using Ar gas (S106). Furthermore, the first mask layer of the bottom surface of the concave portions is removed by means of RIE using $SF_6$ gas (S108).

Figure 5:
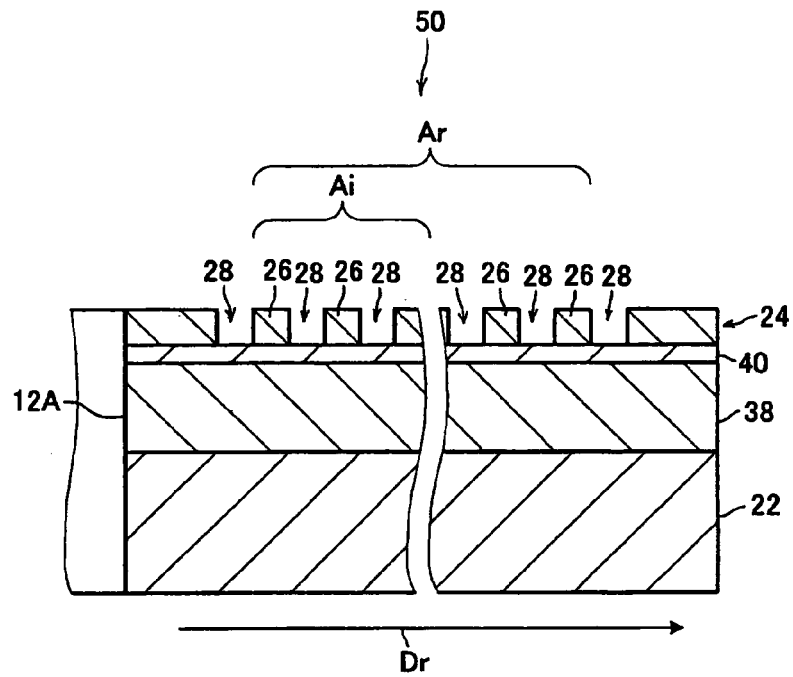
FIG. 5 is a cross-sectional view in the radial direction, illustrating a workpiece in which a recording layer is processed into a concavo-convex pattern during the manufacturing steps of the magnetic recording medium.

Subsequently, as shown in FIG. 5, the continuous recording layer of the bottom surface of the concave portions is removed by means of RIE using CO gas and $NH_3$ gas, so that the continuous recording layer is divided into a large number of recording elements 26, whereby the recording layer 24 is formed into the concavo-convex pattern (S110).

Figure 6:
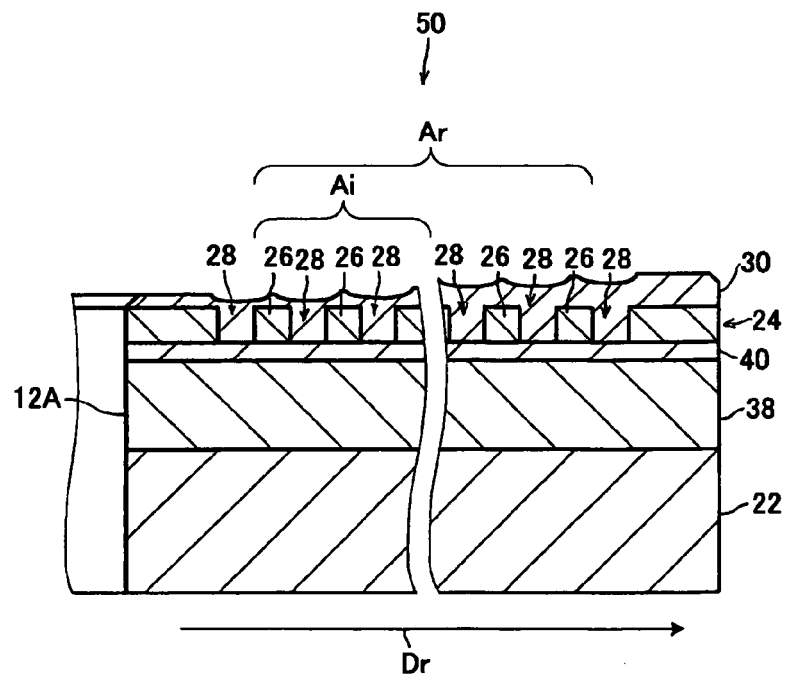
FIG. 6 is a cross-sectional view in the radial direction, illustrating the workpiece in which a filling material is deposited over the recording layer formed in the concavo-convex patter.

Subsequently, as shown in FIG. 6, the filling material 30 is deposited over a workpiece 50 by means of a bias sputtering method, whereby the concave portions 28 between the recording elements 26 are filled with the filling material 30 (S112). Preferably, a material having an amorphous structure or a material in a microcrystalline state is used as the material for the filling material 30, since the use of such a material prevents the formation of gaps in the side surfaces and bottom surfaces of the concave portions 28. In the present application, the expression "a material in a microcrystalline state" is used to refer to a material which does not exhibit crystalline peaks in an X-ray diffraction pattern. Silicon oxide composed mainly of $SiO_2$ is a microcrystal in which grain growth is suppressed and which an amorphous structure can be obtained by selecting certain deposition conditions. Hence, it is preferable to use silicon oxide which is composed mainly of $SiO_2$ as the filling material 30.

During bias sputtering, the deposition of the filling material 30 and the etching of the upper surface of the deposited filling material 30 proceed simultaneously by applying a bias voltage to the workpiece 50. Since deposition proceeds faster than etching, the filling material 30 is deposited. During etching, protruding portions are selectively removed, i.e., the end portions of the protruding portions are removed at a faster rate than non-protruding portions therearound. Therefore, the filling material 30 is deposited over the workpiece 50 so as to cover the recording elements 26 with concavo-convex shape on the surface being suppressed to a certain degree.

In this step, the bias voltage is controlled such that the deposition rate (being the combined rate of deposition and etching) continuously decreases from the outer side of the recording area Ar toward the inner side in the radial direction Dr. Specifically, for example, by placing an electrode for applying the bias voltage near the center of the workpiece 50, the bias voltage in the workpiece 50 continuously increases from the outer side of the recording area Ar toward the inner side in the radial direction Dr. Hence, etching during bias sputtering continuously increases in the radial direction Dr from the outer side of the recording area Ar toward the inner side, whereby the combined deposition rate of the deposition and etching continuously decreases from the outer side of the recording area Ar toward the inner side in the radial direction Dr. Therefore, as shown in FIG. 6, the thickness of the deposited filling material 30 decreases inwardly in the radial direction Dr.

When the innermost concave portion 28 in the radial direction Dr is filled with the filling material 30 to a level near the upper surface of the recording element 26, the deposition of the filling material 30 is stopped.

Figure 7:
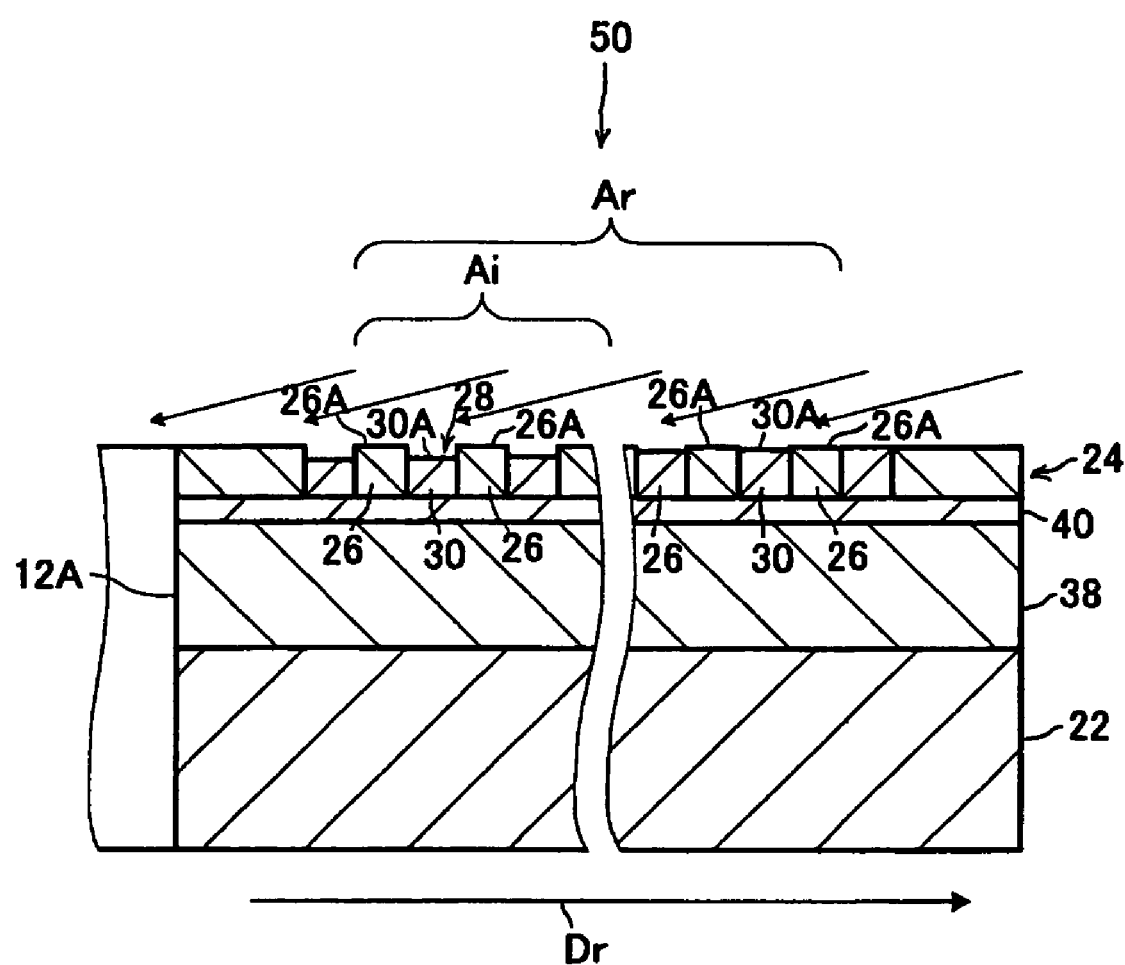
FIG. 7 is a cross-sectional view in the radial direction, illustrating the workpiece in which an excess part of the filling material is removed in a flattening step.

Subsequently, as shown in FIG. 7, while the workpiece 50 is rotated, an excess portion of the filling material 30 above the recording elements 26 is removed by means of IBE using an inert gas such as Ar to flatten the surface (S114). During IBE, the incident angle of the processing gas is inclined with respect to a direction perpendicular to the surface of the workpiece 50, as indicated by the arrows shown in FIG. 7. In this manner, the tendency of the etching rate on the protruding portions to be higher than that on the recessed portions becomes pronounced. In particular, when an inert gas such as Ar is used as the processing gas, the anisotropic etching effect is enhanced, and therefore the tendency of the etching rate on the protruding portions to be higher than that on the recessed portions becomes more pronounced.

In this step, the divergence state of the ion beam is controlled, whereby the processing gas is projected such that the etching rate continuously increases in the radial direction Dr from the outer side of the recording area Ar toward the inner side. The ion gun used in the IBE is designed such that the divergence of ions caused by accelerating the ions is suppressed by controlling a suppressor voltage applied to the suppressor in a grid, so that, for example, the ion beam can converge so as to be projected uniformly onto the surface to be processed. In other words, by controlling voltage for accelerating ions, the divergence state of the ion beam can be adjusted. Furthermore, by controlling the suppressor voltage, the divergence state of the ion beam can be adjusted. Hence, by controlling the voltage for accelerating ions and/or the suppressor voltage, the divergence (and convergence) of the ion beam can be adjusted. In this manner, the velocity and density of the ion beam projected onto the workpiece can be continuously increased from the outer side of the recording area Ar toward the inner side in the radial direction Dr, whereby the etching rate can be continuously increased from the outer side of the recording area Ar toward the inner side in the radial direction Dr.

In the present step, it is also preferable that the etching rate for the filling material 30 be higher than the etching rate for the recording elements 26. When the recording elements 26 are formed of an alloy containing Co and Cr and the filling material 30 is formed of silicon oxide, the etching rate for the filling material 30 can be made higher than the etching rate for the recording elements 26 by restricting the incident angle of the ion beam within the range of −2 to 30°. As used herein, the incident angle of the ion beam is the angle formed by the principal projection direction of the ion beam and the surface of the workpiece 50. When the principal projection direction of the ion beam is parallel to the surface of the workpiece, the incident angle is 0°.

As shown in FIG. 7, when the filling material 30 deposited above the recording layer 24 is completely removed in the outermost portion (in the radial direction Dr) of the workpiece 50, the projection of the ion beam is stopped.

As described above, in the filling material deposition step (S112), the filling material 30 is deposited such that the thickness thereof decreases in the radial direction Dr from the outer side of the recording area Ar toward the inner side. In addition to this, in the flattening step (S114), while the excess portion of the filling material 30 is removed, the etching rate is controlled so as to continuously increase from the outer side of the recording area Ar toward the inner side in the radial direction Dr. In this manner, the height of the steps between the upper surface of the recording element 26 and the upper surface of the filling material 30 increases from the outer side of the recording area Ar toward the inner side in the radial direction Dr.

Subsequently, the protection layer 34 is formed on the upper surfaces of the recording elements 26 and the filling material 30 by means of a CVD method (S116). Furthermore, the lubrication layer 36 is applied to the protection layer 34 by means of a dipping method (S118). Thus, the magnetic recording medium 12 is completed. The protection layer 34 and the lubrication layer 36 are deposited such that each step between the upper surface 26A of a recording element 26 and the upper surface 30A of the filling material 30 is reflected in the corresponding step on the upper surface of each of the protection layer 34 and the lubrication layer 36. Therefore, a magnetic recording medium 12 is obtained in which the height of the steps on the surface 32 increases from the outer side of the recording area Ar toward the inner side in the radial direction Dr, as shown in FIGS. 2 and 3.

A description will now be given of a second exemplary embodiment of the present invention.

Figure 8:
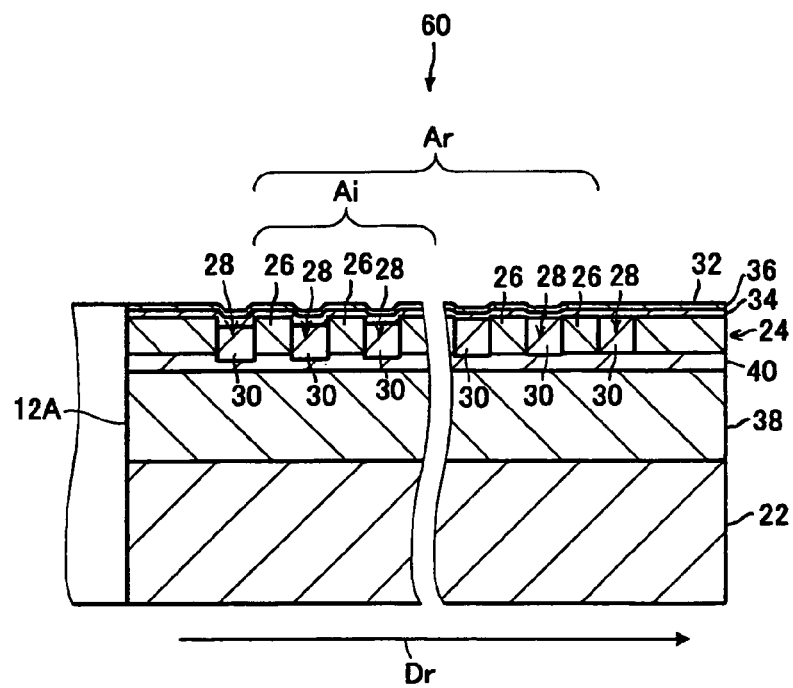
FIG. 8 is a cross-sectional view in the radial direction, schematically illustrating the structure of a magnetic recording medium according to a second exemplary embodiment of the present invention.
Figure 9:
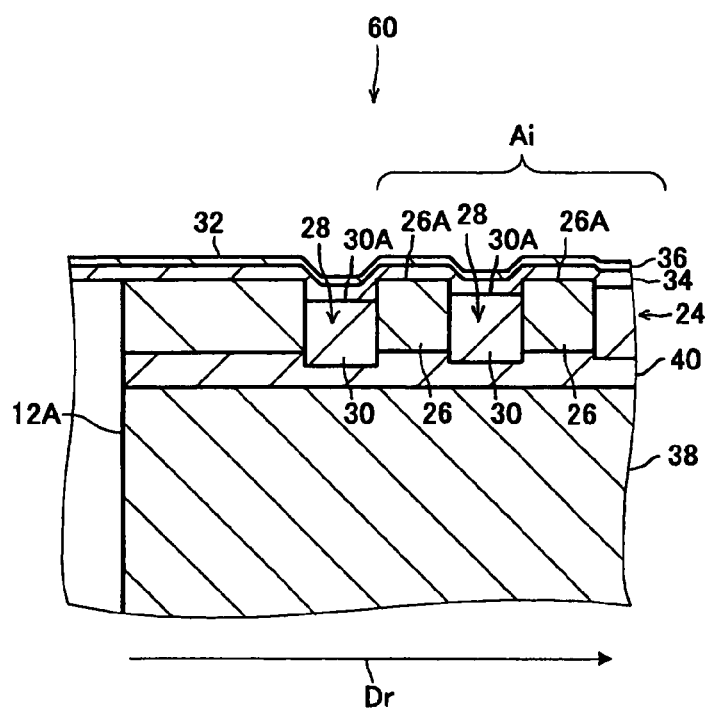
FIG. 9 is an enlarged cross-sectional view in the radial direction, schematically illustrating the structure near the surface of the magnetic recording medium.

As shown in FIGS. 8 and 9, in contrast to the magnetic recording medium 12 according to the first exemplary embodiment, a magnetic recording medium 60 according to the second exemplary embodiment is characterized in that the depth of the concave portions 28 increases from the outer side of the recording area Ar toward the inner side in the radial direction Dr. Since other components are the same as those of the magnetic recording medium 12, the same numerals as those used in FIGS. 1 to 4 are used for the same components, and the description thereof will be omitted.

In addition to this, since the action of the magnetic recording medium 60 is the same as that of the magnetic recording medium 12 except for the action in the manufacturing steps, the description of the action except for the action in the manufacturing steps will be omitted.

A description will now be given of a method for manufacturing the magnetic recording medium 60.

In the method for manufacturing the magnetic recording medium 60, the recording layer processing step (S110) is different from that in the method for manufacturing the magnetic recording medium 12. Since other steps are the same as those in the first exemplary embodiment, the description thereof will be omitted.

Specifically, in the recording layer processing step (S110), the bias voltage applied to the workpiece 50 is controlled, whereby the processing gas is projected such that the etching rate continuously increases from the outer side of the recording area Ar toward the inner side in the radial direction Dr. For example, by placing an electrode for applying the bias voltage near the center of the workpiece 50, the distribution of the bias voltage in the workpiece 50 continuously increases from the outer side of the recording area Ar toward the inner side in the radial direction Dr. In this manner, the velocity and density of the processing gas projected onto the workpiece 50 continuously increases from the outer side of the recording area Ar toward the inner side in the radial direction Dr, and therefore the etching rate continuously increases from the outer side of the recording area Ar toward the inner side in the radial direction Dr. Hence, the depth of the concave portions 28 between the recording elements 26 increases from the outer side of the recording area Ar toward the inner side in the radial direction Dr. In FIGS. 8 and 9, etching reaches halfway depth of the seed layer 40 in the thickness direction, but etching may be continued to halfway depth of the soft magnetic layer 38 in the thickness direction. Furthermore, in part of or all of the concave portions 28, etching may be terminated at halfway depth of the recording layer 24 in the thickness direction, whereby a recording layer having a continuous bottom surface may be formed.

As described above, by allowing the depth of the concave portions 28 to increase from the outer side of the recording area Ar toward the inner side in the radial direction Dr, the height of the steps on the surface 32 is allowed to increase inwardly in the radial direction Dr.

Furthermore, even when the filling material 30 is deposited to a uniform thickness in the filling material deposition step (S112) or even when the filling material 30 is etched at a uniform etching rate in the flattening step (S114), the height of the steps on the surface 32 is allowed to increase inward in the radial direction Dr.

Figure 10:
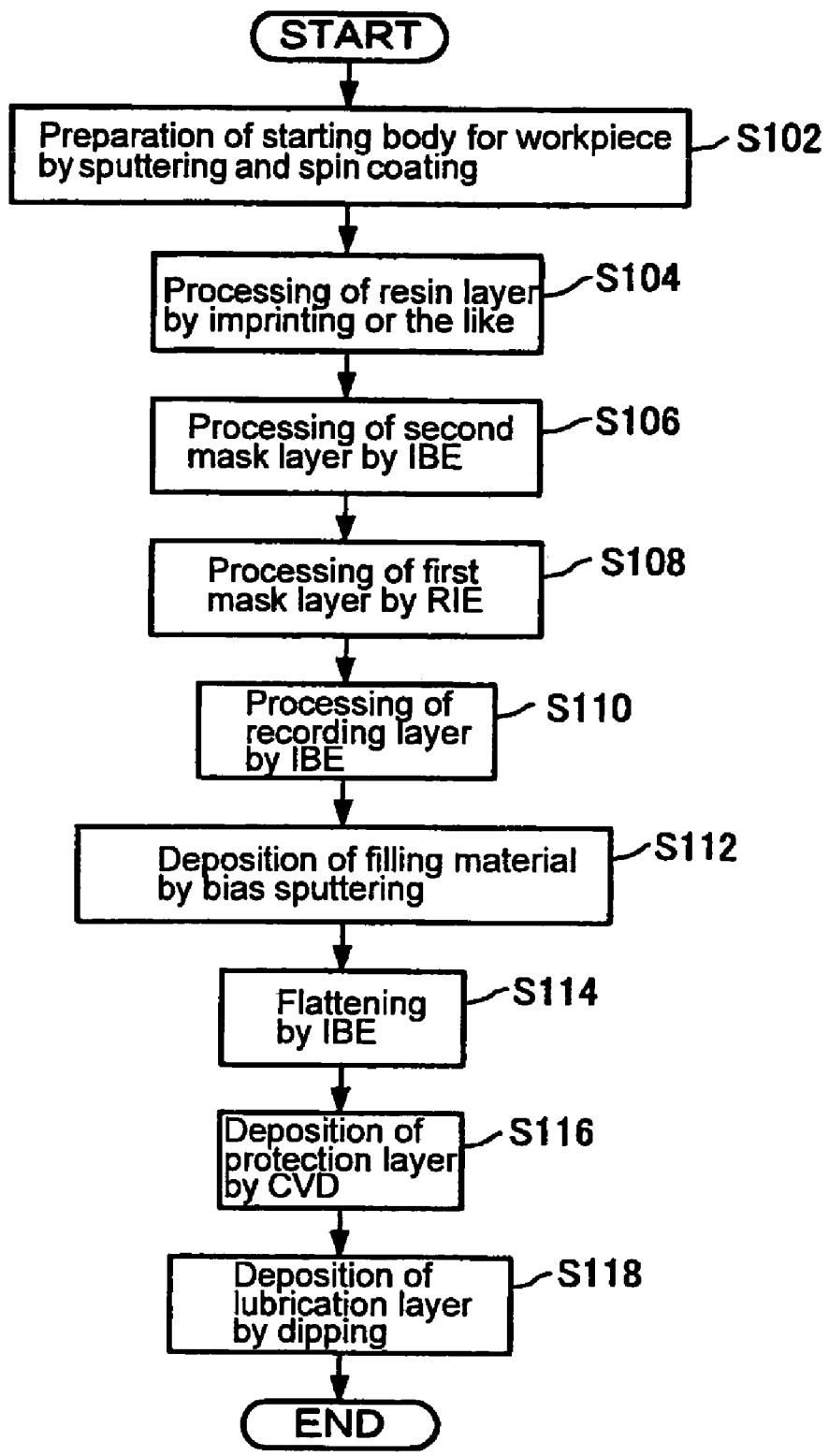
FIG. 10 is a flowchart showing the outline of another example of the manufacturing steps of the magnetic recording medium.

As shown in FIG. 10, in the recording layer processing step (S110), the recording layer 24 may be processed by means of IBE using an inert gas such as Ar as in the flattening step (S114). When the recording layer 24 is processed by means of IBE, the ion beam is perpendicularly projected onto the surface of the workpiece 50. In IBE, the divergence (or convergence) of the ion beam is adjusted by controlling the voltage for accelerating ions and/or the suppressor voltage, whereby the velocity and density of the ion beam projected onto the workpiece can be continuously increased from the outer side of the recording area Ar toward the inner side in the radial direction Dr, as described in the flattening step (S114). Therefore, the etching rate can be continuously increased from the outer side of the recording area Ar toward the inner side in the radial direction Dr, and the depth of the concave portions 28 is allowed to increase in the radial direction Dr from the outer side of the recording area Ar toward the inner side.

Even when the etching rate or the deposition rate is uniform in one or two of the recording layer processing step (S110), the filling material deposition step (S112), and the flattening step (S114), the height of the steps on the surface 32 is allowed to increase inwardly in the radial direction Dr by changing the etching rate and/or the deposition rate depending on a position in the radial direction Dr in the other one or two steps as described above.

A description will now be given of a third exemplary embodiment of the present invention.

Figure 11:
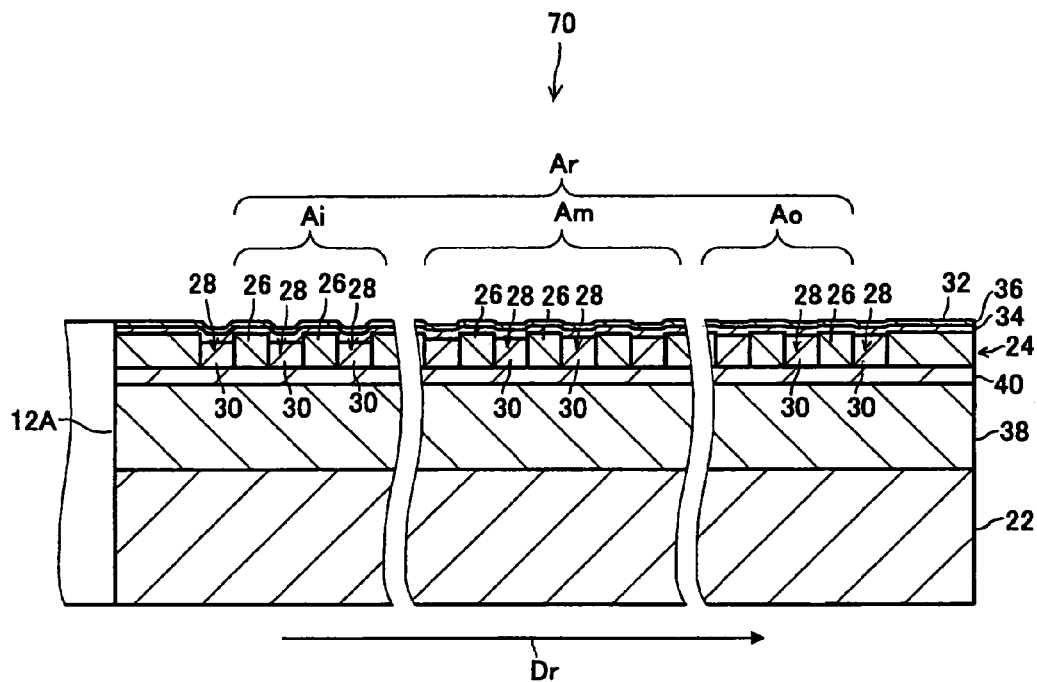
FIG. 11 is a cross-sectional view in the radial direction, schematically illustrating the structure of a magnetic recording medium according to a third exemplary embodiment of the present invention.

In the magnetic recording medium 12 according to the first exemplary embodiment, the height of the steps on the surface 32 continuously increases inward in the radial direction Dr. However, as shown in FIG. 11, a magnetic recording medium 70 according to the third exemplary embodiment is characterized in that the height of the steps on the surface 32 increases stepwise from the outer side toward the inner side in the radial direction Dr. Since other components are the same as those of the magnetic recording medium 12, the same numerals as those used in FIGS. 1 to 3 are used for the same components, and the description thereof will be omitted.

Specifically, in the magnetic recording medium 70, the height of steps on the surface 32 is largest in the inner area Ai and is smallest in an annular outer area Ao including the outermost portion (in the radial direction Dr) of the recording area Ar. In an annular intermediate area Am disposed between the inner area Ai and the outer area Ao so as to be adjoining the inner area Ai, the height of the steps is an intermediate value of the height of steps in the areas on both sides of the intermediate area Am. Note that the height of steps is substantially constant within each of the areas.

Even when the height of the steps on the surface 32 increases stepwise from the outer side toward the inner side in the radial direction Dr as described above, the flying height of the magnetic head 14 can be made lower in the inner area Ai than in the intermediate area Am (being an area adjoining the inner area Ai) and in the outer area Ao. Hence, the magnetic gap between the upper surface of each recording element 26 and the magnetic head 14 is smaller in the inner area Ai than in the intermediate area Am and in the outer area Ao. Therefore, the output level of the servo signal is larger in the inner area Ai than in the intermediate area Am and in the outer area Ao. Hence, in the inner area Ai, the magnitude of the noise is small relative to the output level of the servo signal, and therefore the S/N ratio is improved.

As a method for manufacturing the magnetic recording medium 70 in which the height of the steps on the surface 32 increases stepwise from the outer side toward the inner side in the radial direction Dr as described above, for example, the following methods may be used: a method in which, in the filling material deposition step (S112), an electrode for applying the bias voltage is provided independently for each of the inner area Ai, the intermediate area Am, and the outer area Ao, so that a voltage is applied to each electrode such that the voltage is higher on an electrode disposed nearer to the inner side in the radial direction Dr; and a method in which RIE is employed in the recording layer processing step (S110) and/or in the flattening step (S114) and an electrode for applying the bias voltage is provided independently for each of the inner area Ai, the intermediate area Am, and the outer area Ao as in the case of the filling material deposition step (S112), so that a voltage is applied to each electrode such that the voltage is higher on an electrode disposed nearer to the inner side in the radial direction Dr.

In the third exemplary embodiment, the height of steps on the surface 32 increases stepwise, i.e., by three steps, from the outer side to the inner side in the radial direction Dr. The increase may be achieved by two steps or four or more steps.

A description will now be given of a fourth exemplary embodiment of the present invention.

Figure 12:
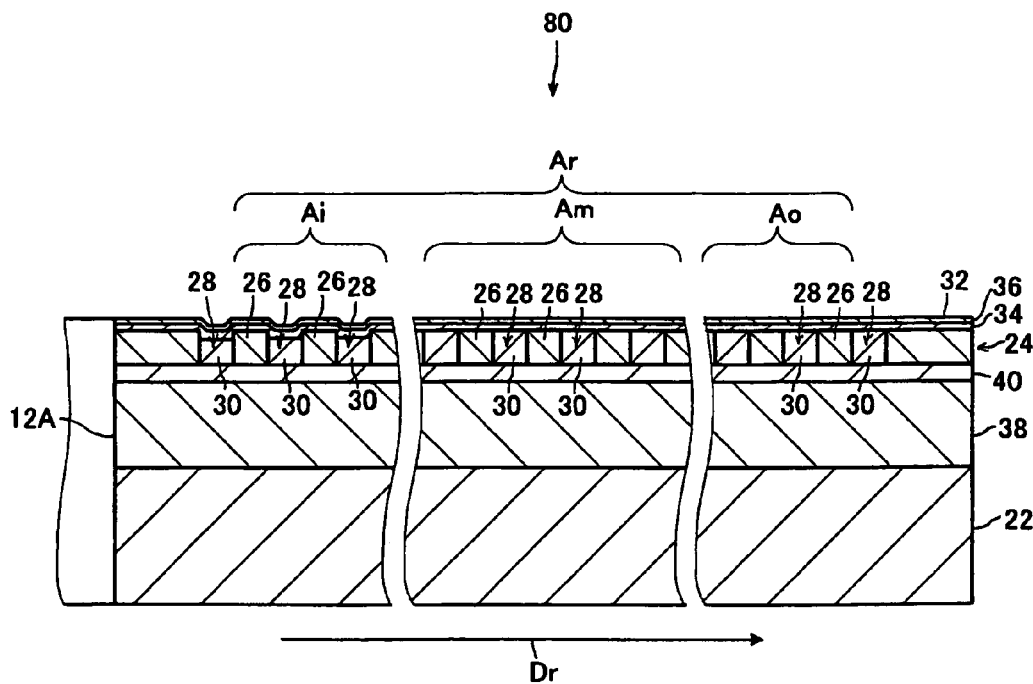
FIG. 12 is a cross-sectional view in the radial direction, schematically illustrating the structure of a magnetic recording medium according to a fourth exemplary embodiment of the present invention.

In the magnetic recording medium 12 according to the first exemplary embodiment, the steps on the surface 32 are formed over the entire recording area Ar. However, as shown in FIG. 12, a magnetic recording medium 80 according to the fourth exemplary embodiment is characterized in that the steps on the surface 32 are formed only in the inner area Ai and that the surface 32 is substantially flat in the intermediate area Am and in the outer area Ao. Since other components are the same as those of the magnetic recording medium 12, the same numerals as those used in FIGS. 1 to 3 are used for the same components, and the description thereof will be omitted.

The height of the steps on the surface 32 may be constant in the inner area Ai or may increase continuously in the inner area Ai from the outer side toward the inner side in the radial direction Dr.

Even when the step on the surface 32 is formed only in the inner area Ai as described above, the flying height of the magnetic head 14 is smaller in the inner area Ai than in the intermediate area Am (being an area adjoining the inner area Ai) and in the outer area Ao. Hence, the magnetic gap between the upper surface of each recording element 26 and the magnetic head 14 is smaller in the inner area Ai than in the intermediate area Am and in the outer area Ao. Therefore, the output level of the servo signal is larger in the inner area Ai than in the intermediate area Am and in the outer area Ao. Hence, in the inner area Ai, the magnitude of the noise is small relative to the output level of the servo signal, and therefore the S/N ratio is improved.

As a method for manufacturing the magnetic recording medium 80 in which the steps on the surface 32 are formed only in the inner area Ai, for example, the following methods may be used: a method in which, in the filling material deposition step (S112), an electrode for applying the bias voltage is provided independently for each of the inner area Ai and other areas, so that a voltage is applied to each electrode such that the voltage applied to the inner area Ai is higher than that applied to the other areas; and a method in which RIE is employed in the recording layer processing step (S110) and/or in the flattening step (S114) and an electrode for applying the bias voltage is provided independently for each of the inner area Ai and the other areas as in the case of the filling material deposition step (S112), so that a voltage is applied to each electrode such that the voltage applied to the inner area Ai is higher than that applied to the other areas. Moreover, as a method for forming the steps on the surface 32 only in the inner area Ai such that the height of the steps continuously increases inwardly in the radial direction Dr, for example, the following method may be used: a method in which, in contrast to the manufacturing method in the first exemplary embodiment, in the filling material deposition step (S112), an electrode for correcting the deposition rate such that the deposition rate is constant in the intermediate area Am and in the outer area Ao is provided in portions corresponding to the intermediate area Am and the outer area Ao.

Fine protrusions and recesses may be formed in a substantially flat portion in the surface 32 of the magnetic recording medium 80 in order to prevent adhesion of the magnetic head 14 to the surface 32.

A description will now be given of a fifth exemplary embodiment of the present invention.

Figure 13:
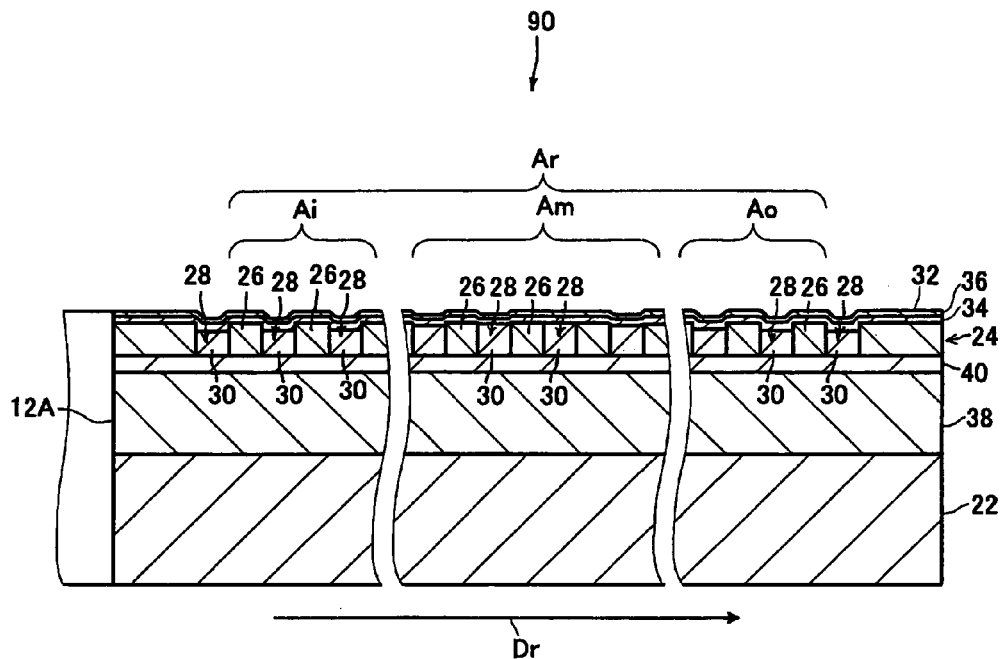
FIG. 13 is a cross-sectional view in the radial direction, schematically illustrating the structure of a magnetic recording medium according to a fifth exemplary embodiment of the present invention.

In the magnetic recording medium 12 according to the first exemplary embodiment, the height of the steps on the surface 32 continuously increases inwardly in the radial direction Dr. However, as shown in FIG. 13, a magnetic recording medium 90 according to the fifth exemplary embodiment is characterized in that the height of the steps on the surface 32 is larger in the inner area Ai and the outer area Ao than in the intermediate area Am which is placed between the inner area Ai and the outer area Ao so as to be adjoining the inner area Ai. Note that the height of the steps on the surface 32 continuously increases from the midpoint of the intermediate area Am in the radial direction Dr toward the inner side in the radial direction Dr and continuously increases from the midpoint of the intermediate area Am toward the outer side in the radial direction Dr. Since other components are the same as that of the magnetic recording medium 12, the same numerals as those used in FIGS. 1 to 3 are used for the same components, and the description thereof will be omitted.

Even when the height of the steps on the surface 32 is larger in the inner area Ai and the outer area Ao than in the intermediate area Am as described above, the flying height of the magnetic head 14 is smaller in the inner area Ai than in the intermediate area Am (being the area adjoining the inner area Ai). Hence, the magnetic gap between the upper surface of each recording element 26 and the magnetic head 14 is smaller in the inner area Ai than in the intermediate area Am. Therefore, the output level of the servo signal is larger in the inner area Ai than in the intermediate area Am. Hence, in the inner area Ai, the magnitude of the noise is small relative to the output level of the servo signal, and therefore the S/N ratio is improved.

For example, when the outer diameter of the magnetic recording medium 12 is relatively large or when the rotation speed of the magnetic recording medium 12 is relatively high, the relative speed between the magnetic recording medium 12 and the magnetic head 14 can be significantly high in the outer area Ao which includes the outermost portion of the recording area Ar of the magnetic recording medium 12. In such a case, even when the surface of the magnetic recording medium is flat, the flying height of the magnetic head 14 can be larger in the outer area Ao than in the other areas. Therefore, the recording-reproducing characteristics may deteriorate.

In view of the foregoing, in the magnetic recording medium 90, the height of the steps on the surface 32 is larger in the outer area Ao than in the intermediate area Am. Hence, the flying height of the magnetic head 14 is lower accordingly in the outer area Ao. Therefore, the increase of the flying height of the magnetic head 14 can be suppressed in the outer area Ao.

When the height of the steps on the surface 32 is larger in the inner area Ai and the outer area Ao than in the intermediate area Am, it is preferable that the steps on the surface 32 be formed such that the recording area Ar can be sectioned into the inner area Ai, the intermediate area having a width in the radial direction Dr that is the same as that of the inner area Ai, and the outer area Ao having a width in the radial direction Dr that is the same as that of the inner area Ai.

When the recording area Ar is composed only of the inner area Ai, the intermediate area, and the outer area Ao, it is preferable that the steps on the surface 32 be formed such that the recording area Ar is trisected in the radial direction Dr so as to be divided into the inner area Ai, the intermediate area, and the outer area Ao.

When the outer diameter of the magnetic recording medium 12 is small or when the rotation speed is slow, the fluctuations of the flying height of the magnetic head 14 are less likely to occur even when the relative speed between the magnetic recording medium 12 and the magnetic head 14 are different depending on positions of the magnetic recording medium 12 in the radial direction Dr. In such a case, the configuration of any of the first to fourth exemplary embodiments may be employed.

As a method for manufacturing the magnetic recording medium 90 in which the height of the steps on the surface 32 is larger in the inner area Ai and the outer area Ao than in the intermediate area Am as described above, for example, the following methods may be used: a method in which, in the filling material deposition step (S112), an electrode for applying the bias voltage is provided in portions on the inner and outer sides (in the radial direction Dr) of the workpiece 50; and a method in which, in the recording layer processing step (S110) and/or in the flattening step (S114), RIE is used and an electrode for applying the bias voltage is provided in portions on the inner and outer sides (in the radial direction Dr) of the workpiece 50 as in the case of the filling material deposition step (S112).

A description will now be given of a sixth exemplary embodiment of the present invention.

Figure 14:
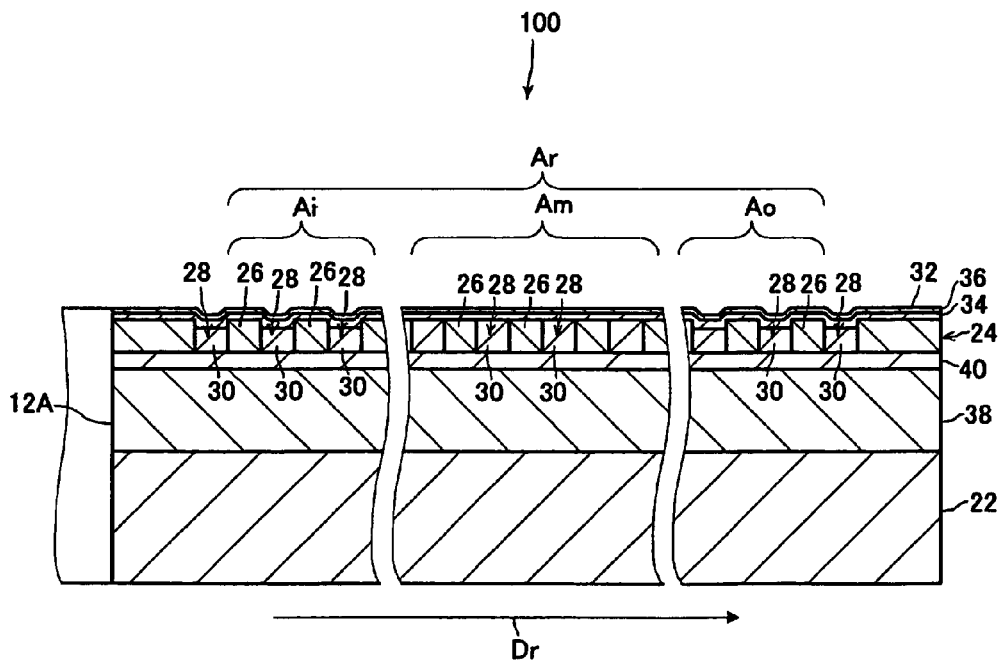
FIG. 14 is a cross-sectional view in the radial direction, schematically illustrating the structure of a magnetic recording medium according to a sixth exemplary embodiment of the present invention.

In the magnetic recording medium 90 according to the fifth exemplary embodiment, the height of the steps on the surface 32 continuously increases from the midpoint of the intermediate area Am located in the middle in the radial direction Dr toward the inner side in the radial direction Dr and also continuously increases from the midpoint of the intermediate area Am toward the outer side in the radial direction Dr. However, as shown in FIG. 14, a magnetic recording medium 100 according to the sixth exemplary embodiment is characterized in that the steps on the surface 32 are formed in the inner area Ai and the outer area Ao and that the surface 32 is substantially flat in the intermediate area Am located in the middle in the radial direction Dr. Since other components are the same as those of the magnetic recording medium 90, the same numerals as those used in FIGS. 1 to 3 are used for the same components, and the description thereof will be omitted.

When the steps on the surface 32 are formed in the inner area Ai and the outer area Ao and the surface 32 is substantially flat in the intermediate area Am as described above, the flying height of the magnetic head 14 is lower in the inner area Ai than in the intermediate area Am (being an area adjoining the inner area Ai). Hence, the magnetic gap between the upper surface of each recording element 26 and the magnetic head 14 is smaller in the inner area Ai than in the intermediate area Am. Therefore, the output level of the servo signal is larger in the inner area Ai than in the intermediate area Am. Hence, in the inner area Ai, the magnitude of the noise is small relative to the output level of the servo signal, and therefore the S/N ratio is improved.

When the relative speed between the magnetic recording medium 100 and the magnetic head 14 is significantly high in the outer area Ao, the increase of the flying height of the magnetic head 14 in the outer area Ao can be suppressed since the steps on the surface 32 are formed in the outer area Ao.

In FIG. 14, the height of the steps on the surface 32 is constant in the inner area Ai. However, another configuration can be used in which, in the inner area Ai, the height of the steps on the surface 32 increases from the outer side toward the inner side in the radial direction Dr. Similarly, in FIG. 14, the height of the steps on the surface 32 is constant in the outer area Ao. However, still another configuration can be used in which, in the outer area Ao, the height of the steps on the surface 32 increases outward in the radial direction Dr.

As a method for manufacturing the magnetic recording medium 100 in which the steps on the surface 32 are formed in the inner area Ai and the outer area Ao and the surface 32 is substantially flat in the intermediate area Am as described above, for example, the following methods may be used: a method in which, in the filling material deposition step (S112), an electrode for applying the bias voltage is provided independently for each of the inner area Ai, the intermediate area Am, and the outer area Ao, so that a voltage is applied to each electrode such that the voltages applied to the inner area Ai and the outer area Ao are higher than the voltage applied to the intermediate area Am; and a method in which RIE is employed in the recording layer processing step (S110) and/or in the flattening step (S114) and an electrode for applying the bias voltage is provided independently for each of the inner area Ai, the intermediate area Am, and the outer area Ao as in the case of the filling material deposition step (S112), so that a voltage is applied to each electrode such that the voltages applied to the inner area Ai and the outer area Ao are higher than the voltage applied to the intermediate area Am. In addition to this, a method can be used in which, in the flattening step (S114), IBE is employed to control the divergence and convergence of the ion beam.

A description will now be given of a seventh exemplary embodiment of the present invention.

Figure 15:
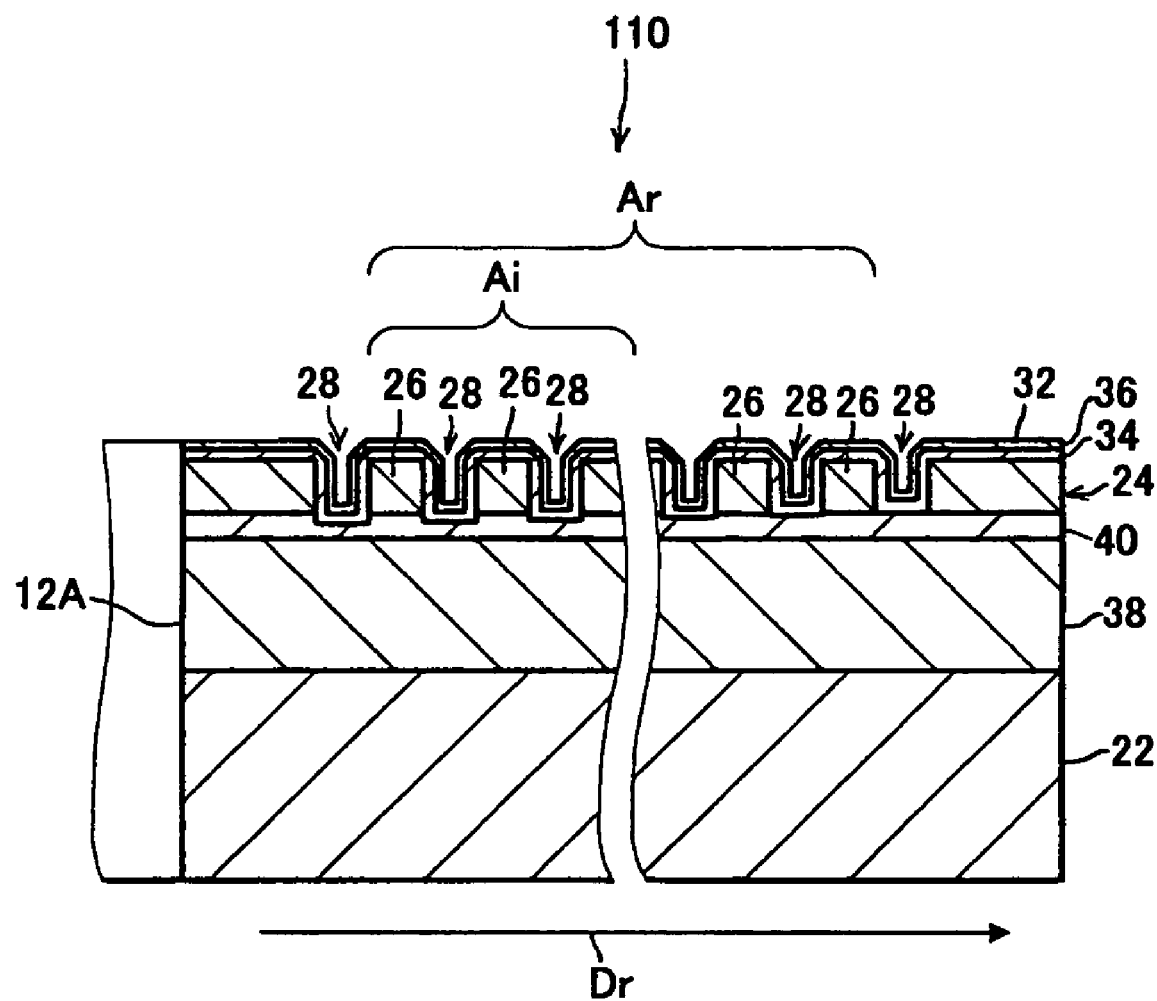
FIG. 15 is a cross-sectional view in the radial direction, schematically illustrating the structure of a magnetic recording medium according to a seventh exemplary embodiment of the present invention.

In the first to sixth exemplary embodiments, the concave portions 28 between the recording elements 26 are at least partially filled with the filling material 30, and the steps on the surface 32 are formed such that each step between the upper surface 30A of the filling material 30 and the upper surface 26A of the adjacent recording element 26 is reflected in the corresponding step on the surface 32 thereover. In addition to this, the height of the steps on the surface 32 in the inner area Ai is larger than that in the annular area adjoining the inner area. However, as shown in FIG. 15, a magnetic recording medium 110 according to the seventh exemplary embodiment is characterized in that the steps on the surface 32 are formed in the inner area Ai by allowing the depth of the concave portions 28 to increase inward in the radial direction Dr without filling the concave portions 28 with the filling material, and that the height of the steps on the surface 32 is larger in the inner area Ai than in the annular area adjoining the inner area. Since other components are the same as those in the first to sixth exemplary embodiments, the same numerals as those used in FIGS. 1 to 14 are used for the same components, and the description thereof will be omitted.

Also in this case, the flying height of the magnetic head 14 is lower in the inner area Ai than in the annular area adjoining the inner area Ai. Hence, the magnetic gap between the upper surface of each recording element 26 and the magnetic head 14 is smaller in the inner area Ai than in the annular area adjoining the inner area Ai. Therefore, the output level of the servo signal is larger in the inner area Ai than in the annular area adjoining the inner area Ai. Hence, in the inner area Ai, the magnitude of the noise is small relative to the output level of the servo signal, and therefore the S/N ratio is improved.

As a method for manufacturing the magnetic recording medium 110, a method similar to any of the methods exemplified in the second exemplary embodiment may be used. It is noted that the filling material deposition step (S112) and the flattening step (S114) are omitted.

A description will now be given of an eighth exemplary embodiment of the present invention.

Figure 16:
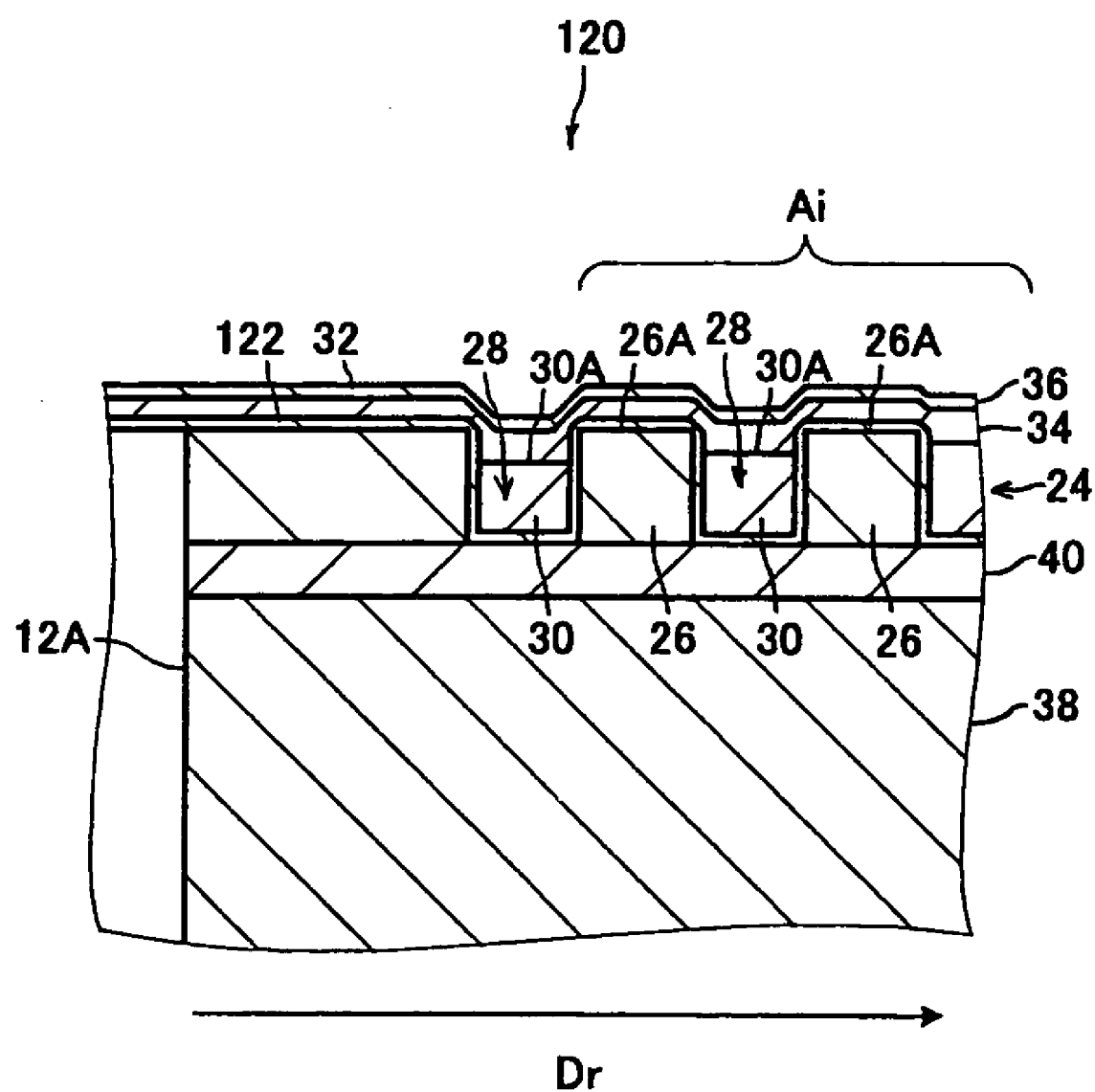
FIG. 16 is a cross-sectional view in the radial direction, schematically illustrating the structure of a magnetic recording medium according to an eighth exemplary embodiment of the present invention.

In the first to seventh exemplary embodiments, the recording elements 26 come in direct contact with the protection layer 34. However, as shown in FIG. 16, a magnetic recording medium 120 according to the eighth exemplary embodiment is characterized in that a barrier film 122 for protecting the recording layer from being etched in the flattening step (S114) is formed on the recording elements 26. Since other components are the same as those in the first to seventh exemplary embodiments, the same numerals as those used in FIGS. 1 to 15 are used for the same components, and the description thereof will be omitted. The barrier film 122 is formed also on the side surfaces of the recording elements 26 and on the bottom surfaces of the concave portions 28. In the eighth exemplary embodiment, a portion on the surface 32 over the barrier film 122 on the side surface of the recording element 26 is included in "a portion over the recording element." Alternatively, the barrier film may be formed only on the recording elements.

In the first to eighth exemplary embodiments, the protection layer 34 and the lubrication layer 36 are formed over the recording elements 26. However, one or both of the protection layer 34 and the lubrication layer 36 may be omitted in accordance with the required performance.

In the first exemplary embodiment, the first mask layer, the second mask layer, and the resin layer are formed over the continuous recording layer, and the recording layer is processed into a concavo-convex pattern by means of three-step dry etching. However, no particular limitation is imposed on the materials for the resin layer and the mask layers, the number of stacking of these layers, the thickness of these layers, the type of dry etching, and the like, so long as the recording layer can be processed at high accuracy.

In the first to sixth and eighth exemplary embodiments, the continuous recording layer is processed into a concavo-convex pattern by means of dry etching, and the filling material 30 is deposited over the recording layer 24 formed in the concavo-convex pattern to fill the concave portions 28 with the filling material 30. Then, an excess portion of the filling material 30 is removed by dry etching to flatten the surface. However, a magnetic recording medium may be manufactured differently. Specifically, a continuous filling material is processed into a concavo-convex pattern by means of dry etching, and the recording layer is deposited over the filling material formed into the concavo-convex pattern to fill the concave portions with the recording layer. Then, an excess portion of the recording layer is removed by means of dry etching to flatten the surface. In this manner, a magnetic recording medium is manufactured which includes: the recording elements formed as the convex portions of the recording layer formed in the concavo-convex pattern over the substrate; and the filling material filled into the concave portions between the recording elements.

In this case, a dry etching method is used in which the etching rate for the filling material is higher than the etching rate for the recording layer in the flattening step of removing an excess portion of the recording layer, and the flattening step is carried out such that the etching rate for the filling material is higher in the inner area Ai than in the annular area adjoining the inner area Ai. In this manner, a magnetic recording medium can be manufactured in which the height of the steps on the surface 32 is larger in the inner area Ai than in the annular area adjoining the inner area Ai.

In the first to eighth exemplary embodiments, the recording layer 24 is completely separated into parts. However, the recording layer may be processed to halfway depth thereof in the thickness direction to form a recording layer in concavo-convex pattern, which is continuous in the lower portions of the concave portions between the recording elements.

Furthermore, the surface of the substrate may be processed into a concavo-convex pattern in which the depth of the concave portions is larger in the inner area Ai than in the annular area adjoining the inner area Ai, and the recording layer and other layers may be formed so as to follow this concavo-convex pattern. Also in this manner, a magnetic recording medium may be manufactured in which the height of the steps on the surface is larger in the inner area Ai than in the annular area adjoining the inner area Ai. In this case, the recording layer is a continuous film having the concavo-convex pattern on the upper and lower surfaces thereof.

In the first to eighth exemplary embodiments, the soft magnetic layer 38 and the seed layer 40 are formed between the recording layer 24 and the substrate 22. However, the configuration of the layers between the recording layer 24 and the substrate 22 may be appropriately changed according to the type of a magnetic recording medium. For example, an antiferromagnetic layer and/or an under layer may be formed between the soft magnetic layer 38 and the substrate 22. Furthermore, one of the soft magnetic layer 38 and the seed layer 40 may be omitted. In addition, the recording layer 24 may be formed directly on the substrate 22.

In the first to eighth exemplary embodiments, each of the magnetic recording media 12, 60, 70, 80, 90, 100, 110, and 120 is a magnetic disk of a perpendicular recording type. However, various exemplary embodiments of the present invention are also applicable to a magnetic disk of a longitudinal recording type.

In the first to eighth exemplary embodiments, each of the magnetic recording media 12, 60, 70, 80, 90, 100, 110, and 120 has the recording layer 24 formed on one side of the substrate 22. However, various exemplary embodiments of the present invention are also applicable to a magnetic recording medium in which the recording layer and other layers are formed on both sides of a substrate.

In the first to eighth exemplary embodiments, each of the magnetic recording media 12, 60, 70, 80, 90, 100, 110, and 120 has the center hole 12A. However, various exemplary embodiments of the present invention are also applicable to a magnetic recording medium which does not have the center hole.

In the first to eighth exemplary embodiments, each of the magnetic recording media 12, 60, 70, 80, 90, 100, 110, and 120 is a discrete track medium. Various exemplary embodiments of the present invention are also applicable to, for example, patterned media and magnetic disks having spiral-shaped tracks. Moreover, various exemplary embodiments of the present invention are also applicable to magneto-optical disks such as MO disks and heat assisted type magnetic disks in which both magnetism and heat are used.

WORKING EXAMPLE

The magnetic recording medium 12 having the same configuration as that in the first exemplary embodiment (see FIGS. 2 and 3) was manufactured. The principal configuration of the manufactured magnetic recording medium 12 was as follows.

The substrate 22 had a diameter of approximately 48 mm (about 1.89 inches), and was made of glass. The recording layer 24 had a thickness of approximately 20 nm, and was made of a CoCrPt alloy. The material for the filling material 30 was silicon oxide composed mainly of $SiO_2$. The protection layer 34 had a thickness of approximately 2 nm, and was made of DLC. The lubrication layer 36 had a thickness of approximately 1 nm, and was made of PFPE. The recording area Ar extended in the radial range of 8 mm to 23.4 mm from the center. The track pitch (being the pitch between the recording elements 26 in the radial direction Dr) in the data area in the recording area Ar was approximately 200 nm, and the width (being the width in the radial direction Dr) of the upper surface 26A of each recording elements 26 was approximately 100 nm.

The first mask layer had a thickness of approximately 25 nm, and was made of TaSi. The second mask layer had a thickness of approximately 10 nm, and was made of Ni. The resin layer had a thickness of approximately 100 nm, and was made of a negative type resist (NEB22A: product of Sumitomo Chemical Co., Ltd.).

In the recording layer processing step (S110), the etching rate was made substantially constant over the entire recording area Ar.

In the filling material deposition step (S112), the filling material 30 was deposited to a thickness of approximately 20 nm such that the deposition rate was substantially constant over the entire recording area Ar. The deposition conditions were set as follows.

Deposition power (electrical power supplied to a target): 500 W.

Chamber pressure: 0.3 Pa.

Bias power (electrical power supplied to a workpiece): 290 W.

Figure 17:
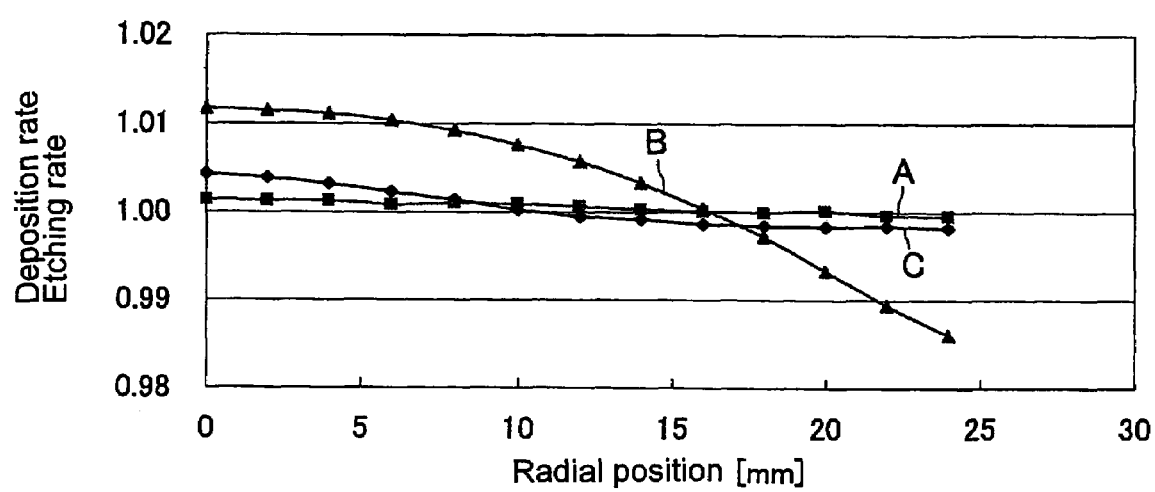
FIG. 17 is a graph showing the relationship between the deposition rate of a filling material and the radial position on the magnetic recording media of Working Example of the present invention and Comparative Example and the relationship between the etching rate in a flattening step and the radial position of the magnetic recording media.

In FIG. 17, a curve labeled with a symbol A shows the relationship between the deposition rate of the filling material 30 and the position in the radial direction Dr on a workpiece obtained by depositing the filling material 30 on another sample having a flat surface under the same conditions as the above deposition conditions. The deposition rate represented by the curve labeled with the symbol A was normalized by setting the deposition rate at a position 16 mm from the center to 1.

Furthermore, a coating material composed of Mo was further deposited to approximately 3 nm on the filling material 30 by means of a sputtering method such that the deposition rate was substantially constant irrespective of the position in the radial direction Dr. The deposition conditions were set as follows.

Deposition power (electrical power supplied to a target) 500 W.

Chamber pressure: 0.3 Pa.

Bias power (electrical power supplied to a workpiece): 0 W.

In the flattening step (S114), Ar was used as the processing gas. The etching conditions were set as follows.

Incident angle: 2°.

Beam voltage: 800 V.

Beam current: 1100 mA.

Suppressor voltage: 520 V.

In FIG. 17, a curve labeled with a symbol B shows the relationship between the etching rate and the position in the radial direction Dr on a workpiece obtained by etching another sample having a flat surface under the same conditions as the above etching conditions. The etching rate represented by the curve labeled with the symbol B was normalized by setting the etching rate of the filling material 30 at a position 16 mm away from the center to 1 as in the deposition rate represented by the curve labeled with the symbol A. Subsequently, the protection layer 34 and the lubrication layer 36 were deposited, whereby the magnetic recording medium 12 was manufactured.

The height of each step between the portion over the recording element 26 and the portion over the filling material 30 on the surface 32 of the obtained magnetic recording medium 12 was measured. Specifically, by means of an AFM (atomic force microscope), the height of the step on the surface 32 was measured at three positions away from the center by 9 mm, 12.5 mm, and 16 mm in the radial direction Dr in a preamble area in the servo area. Here, the preamble area is an area which is placed in the top portion of the servo area for the magnetic head 14 and which is provided for recording information for synchronization with the clock. The measurement results are shown in Table 1.

TABLE 1

| Radial position | 9 mm | 12.5 mm | 16 mm |
|---|---|---|---|
| Step height (Working Example) | 0.9 nm | 0.6 nm | 0.3 nm |
| Step height (Comparative Example) | 0.3 nm | 0.3 nm | 0.3 nm |

In addition to this, the S/N ratio of a reproduction signal was measured at three positions away from the center by 9 mm, 12.5 mm, and 16 mm in the radial direction Dr in the preamble area in the servo area. These positions correspond to the measurement positions for the height of the steps. The measurement results are shown by a curve labeled with a symbol X in FIG. 18.

COMPARATIVE EXAMPLE

In contrast to Working Example, the etching conditions in the flattening step (S114) were set as listed below. A magnetic recording medium was produced under the same other conditions as those in Working Example.

Incident angle: 20.

Beam voltage: 700 V.

Beam current: 1100 mA.

Suppressor voltage: 520 V.

In FIG. 17, a curve labeled with a symbol C shows the relationship between the etching rate and the position in the radial direction Dr on a workpiece obtained by etching another sample having a flat surface under the same conditions as the above etching conditions. The etching rate represented by the curve labeled with the symbol C was normalized by setting the etching rate of the filling material 30 at a position 10 mm from the center to 1.

By means of an AFM (atomic force microscope), the height of the step between the portion over the recording element and the portion over the filling material on the surface of the obtained magnetic recording medium was measured at three positions away from the center by 9 mm, 12.5 mm, and 16 mm in the radial direction Dr in the preamble area in the servo area, as in Working Example. The measurement results are also shown in Table 1.

In addition, the S/N ratio of a reproduction signal was measured at three positions away from the center by 9 mm, 12.5 mm, and 16 mm in the radial direction Dr in the preamble area in the servo area as in Working Example. These positions correspond to the measurement positions for the height of the steps. The measurement results are shown by a curve labeled with a symbol Y in FIG. 18.

Figure 18:
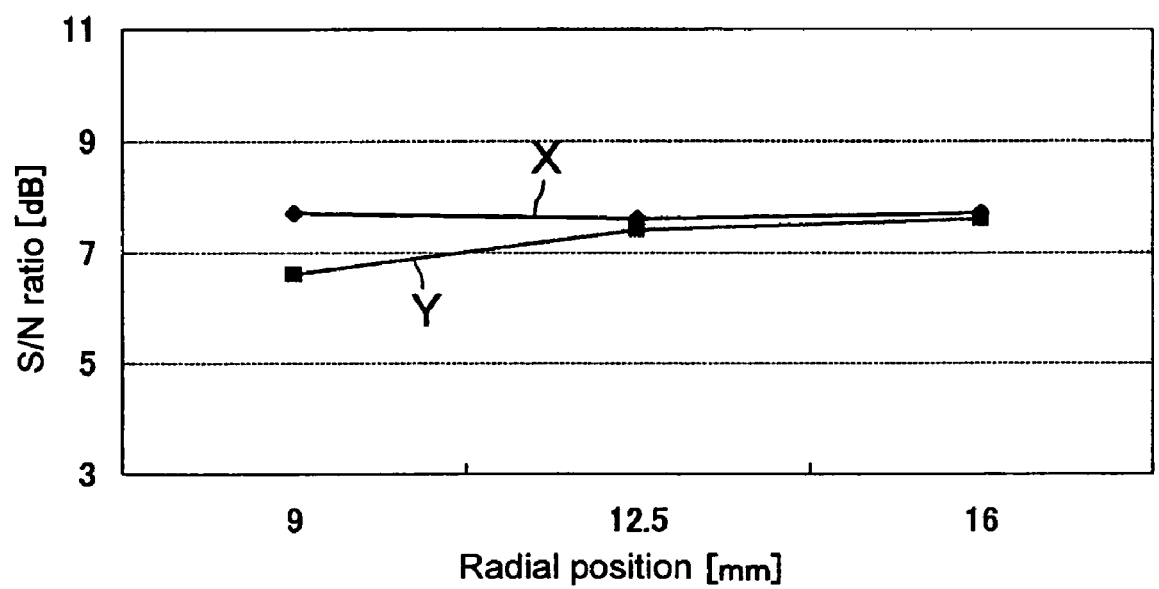
FIG. 18 is a graph showing the relationship between the S/N ratio of a reproduction signal and the radial position on the magnetic recording media of Working Example of the present invention and Comparative Example.

As shown in FIG. 18, the tendency of the S/N ratio to decrease as the measurement position moves toward the inner side in the radial direction Dr was found in Comparative Example. This may be because of the following reason. In Comparative Example, the flying height of the magnetic head was constant since the height of the steps between the portion over the recording element and the portion over the filling material is constant on the surface irrespective of the position in the radial direction Dr as shown in Table 1. Therefore, the characteristics of the magnetic recording medium that the circumferential length of the magnetic domains was smaller and the intensity of a reproduction signal is smaller as the position on the magnetic recording medium is nearer to the inner side in the radial direction Dr were reflected directly on the S/N ratio.

On the other hand, in Working Example, the S/N ratio was substantially constant irrespective of the position in the radial direction Dr. This may be because of the following reason. As shown in Table 1, in Working Example, the height of the steps on the surface 32 was larger as the position on the magnetic recording medium is nearer to the inner side in the radial direction Dr, and therefore the flying height of the magnetic head was smaller as the position on the magnetic recording medium is nearer to the inner side in the radial direction Dr. Furthermore, the circumferential length of the magnetic domains was smaller as the position on the magnetic recording medium is nearer to the inner side in the radial direction Dr. Therefore, the influence of the characteristics of the magnetic recording medium that the reproduction signal is smaller as the position on the magnetic recording medium is nearer to the inner side in the radial direction Dr was canceled or mitigated.

What is claimed is:

1. A magnetic recording medium comprising:
   a substrate; and
   a recording layer formed in a predetermined concavo-convex pattern over the substrate, the recording layer including recording elements each formed as a convex portion of the recording layer,
   wherein surface steps are formed in an inner area including a radially innermost portion of a recording area, each surface step being formed in such a manner that a portion over a concave portion between the recording elements is recessed toward the substrate to a level below a portion over the recording element, and
   wherein the surface steps are formed such that the recording area is sectioned into an annular area adjoining the inner area and the inner area where height of the surface steps therein is larger than that in the annular area.

2. The magnetic recording medium according to claim 1, wherein the surface steps are formed such that the recording area is sectioned into the inner area and the annular area having a radial width that is the same as a radial width of the inner area.

3. The magnetic recording medium according to claim 1, wherein the surface steps are formed such that the recording area is sectioned into the inner area and the annular area so as to be bisected at a radial midpoint thereof.

4. The magnetic recording medium according to claim 1, further comprising a filling material filled into the concave portions, and
   wherein, at least in the inner area, an upper surface of the filling material is recessed toward the substrate to a level below an upper surface of the recording element, so that each step between the upper surface of the filling material and the upper surface of the recording element is reflected in a corresponding surface step of the surface steps.

5. The magnetic recording medium according to claim 1, wherein the height of the surface steps increases in a radially inward direction.

6. A magnetic recording and reproducing apparatus, comprising:
   the magnetic recording medium according to claim 1; and
   a flying type magnetic head which is disposed so as to be capable of flying above a surface of the magnetic recording medium in order to record/reproduce data on/from the magnetic recording medium.

7. A magnetic recording medium comprising:
   a substrate; and
   a recording layer formed in a predetermined concavo-convex pattern over the substrate, the recording layer including recording elements each formed as a convex portion of the recording layer,
   wherein surface steps are formed in an inner area including a radially innermost portion of a recording area and in an outer area including a radially outermost portion of the recording area, each surface step being formed in such a manner that a portion over a concave portion between the recording elements is recessed toward the substrate to a level below a portion over the recording element, and
   wherein the surface steps are formed such that the recording area is sectioned into:
      an annular intermediate area disposed between the inner area and the outer area so as to adjoin the inner area;
      the inner area where height of the surface steps therein is larger than that in the intermediate area; and
      the outer area where height of the surface steps therein is larger than that in the intermediate area.

8. The magnetic recording medium according to claim 7, wherein the surface steps are formed such that the recording area is sectioned into the inner area, the intermediate area having a radial width that is the same as the radial width of the inner area, and the outer area having a radial width that is the same as the radial width of the inner area.

9. The magnetic recording medium according to claim 7, further comprising a filling material filled into the concave portions, and
   wherein, at least in the inner area and in the outer area, an upper surface of the filling material is recessed toward the substrate to a level below an upper surface of the recording element, so that each step between the upper surface of the filling material and the upper surface of the recording element is reflected in a corresponding surface step of the surface steps.

10. A magnetic recording and reproducing apparatus, comprising:
    the magnetic recording medium according to claim 7; and
    a flying type magnetic head which is disposed so as to be capable of flying above a surface of the magnetic recording medium in order to record/reproduce data on/from the magnetic recording medium.

11. A magnetic recording medium comprising:
    a substrate; and
    a recording layer formed in a predetermined concavo-convex pattern over the substrate, the recording layer including recording elements each formed as a convex portion of the recording layer,
    wherein surface steps are formed in a recording area, each surface step being formed in such a manner that a portion over a concave portion between the recording elements is recessed toward the substrate to a level below a portion over the recording element, and
    wherein the surface steps are formed such that an area including at least a radially innermost portion of the recording area is provided where height of the surface steps increases in a radially inward direction.

12. A magnetic recording and reproducing apparatus, comprising:
    the magnetic recording medium according to claim 11; and
    a flying type magnetic head which is disposed so as to be capable of flying above a surface of the magnetic recording medium in order to record/reproduce data on/from the magnetic recording medium.

13. A method for manufacturing a magnetic recording medium, comprising at least one of the following steps:
    a recording layer processing step of forming recording elements as convex portions by irradiating a disk-shaped workpiece with a processing gas by means of one of ion beam etching in which a divergence state of an ion beam is controlled and reactive ion etching in which a bias voltage to be applied to the workpiece is controlled, the workpiece including a continuous recording layer and a mask layer formed in a concavo-convex pattern corresponding to a predetermined concavo-convex pattern over the recording layer, the workpiece being irradiated with the processing gas such that an etching rate is larger in an inner area including a radially innermost portion of a recording area than in an annular area adjoining the inner area, whereby the recording layer is processed into the predetermined concavo-convex pattern;

a filling material deposition step of depositing a filling material over a workpiece by means of bias sputtering in which a bias voltage to be applied to the workpiece is controlled, the workpiece including recording elements formed as convex portions of a recording layer formed in a predetermined concavo-convex pattern over a substrate, the filling material being deposited such that a deposition rate is lower in an inner area including a radially innermost portion of a recording area than in an annular area adjoining the inner area; and a flattening step of removing an excess portion of a filling material above recording elements by irradiating a workpiece with a processing gas by means of one of ion beam etching in which a divergence state of an ion beam is controlled and reactive ion etching in which a bias voltage to be applied to the workpiece is controlled, the workpiece including the recording elements which are formed as convex portions of a recording layer formed in a predetermined concavo-convex pattern over a substrate and the filling material which is deposited over the recording elements and which fills into each concave portion between the recording elements, the workpiece being irradiated with the processing gas such that an etching rate is larger in an inner area including a radially innermost portion of a recording area than in an annular area adjoining the inner area, wherein surface steps are formed in the inner area, each surface step being formed in such a manner that a portion over a concave portion between the recording elements is recessed toward the substrate to a level below a portion over the recording element, and the surface steps are formed such that the recording area is sectioned into the annular area adjoining the inner area and the inner area where height of the surface steps therein is larger than that in the annular area.

* * * * *